(12) United States Patent
Shi et al.

(10) Patent No.: US 12,114,187 B2
(45) Date of Patent: Oct. 8, 2024

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Zhihua Shi, Dongguan (CN); Zhi Zhang, Dongguan (CN); Wenhong Chen, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 546 days.

(21) Appl. No.: 17/396,540

(22) Filed: Aug. 6, 2021

(65) Prior Publication Data

US 2021/0392530 A1 Dec. 16, 2021

Related U.S. Application Data

(63) Continuation of application No. PCT/CN2019/075291, filed on Feb. 15, 2019.

(51) Int. Cl.
*H04W 24/08* (2009.01)
*H04B 17/318* (2015.01)
(Continued)

(52) U.S. Cl.
CPC .......... *H04W 24/08* (2013.01); *H04B 17/318* (2015.01); *H04L 5/0048* (2013.01); *H04W 72/044* (2013.01); *H04W 72/23* (2023.01)

(58) Field of Classification Search
CPC ... H04W 24/08; H04W 72/044; H04W 72/23; H04W 72/542; H04W 48/16;
(Continued)

(56) References Cited

U.S. PATENT DOCUMENTS 11,240,761 B2 * 2/2022 Gong .................. H04W 52/325
11,425,734 B2 * 8/2022 Yasukawa ............. H04L 5/0073
(Continued)

FOREIGN PATENT DOCUMENTS

CN 103299670 A 9/2013
CN 105122678 A 12/2015
(Continued)

OTHER PUBLICATIONS

The first Office Action and search report of corresponding Chinese application No. 202110833298.4, dated Nov. 30, 2022.
(Continued)

*Primary Examiner* — Hoang-Chuong Q Vu
(74) *Attorney, Agent, or Firm* — Ladas & Parry, LLP

(57) ABSTRACT

Embodiments of the present application provide a wireless communication method, a terminal device and a network device, which can implement interference measurement. The method including: receiving, by a terminal device, first configuration information, the first configuration information including m pieces of resource indication information, where a resource indicated by the m pieces of resource indication information is used for performing SRS-based RSRP measurement and/or RSSI measurement, m is a positive integer greater than or equal to 1; performing, by the terminal device, the SRS-based RSRP measurement and/or the RSSI measurement on the resource indicated by the m pieces of resource indication information.

19 Claims, 7 Drawing Sheets

(51) Int. Cl.
*H04L 5/00* (2006.01)
*H04W 72/04* (2023.01)
*H04W 72/044* (2023.01)
*H04W 72/23* (2023.01)

(58) Field of Classification Search
CPC ... H04W 24/02; H04B 17/318; H04B 17/327; H04B 17/345; H04L 5/0048; H04L 1/0026
See application file for complete search history.

(56) References Cited

U.S. PATENT DOCUMENTS

| | | | | |
|---|---|---|---|---|
| 2014/0112184 | A1* | 4/2014 | Chai | H04W 36/0085 370/252 |
| 2018/0323916 | A1 | 11/2018 | Yang et al. | |
| 2020/0213052 | A1* | 7/2020 | Li | H04W 72/23 |
| 2022/0006501 | A1* | 1/2022 | Kim | H04B 7/0632 |
| 2022/0086843 | A1* | 3/2022 | Ying | H04W 72/541 |
| 2022/0104214 | A1* | 3/2022 | Ying | H04L 5/0048 |
| 2022/0116129 | A1* | 4/2022 | Ying | H04B 7/0617 |
| 2022/0124531 | A1* | 4/2022 | Miao | H04B 17/345 |
| 2022/0140959 | A1* | 5/2022 | Pedersen | H04W 72/541 370/329 |

FOREIGN PATENT DOCUMENTS

| | | |
|---|---|---|
| CN | 109219938 A | 1/2019 |
| CN | 109219970 A | 1/2019 |
| CN | 109327847 A | 2/2019 |
| WO | 2012064094 A2 | 5/2012 |
| WO | 2014168427 A1 | 10/2014 |
| WO | 2016048214 A1 | 3/2016 |
| WO | 2018223386 A1 | 12/2018 |
| WO | 2020164150 A1 | 8/2020 |

OTHER PUBLICATIONS

The second Office Action of corresponding Chinese application No. 202110833298.4, dated Jan. 28, 2023.
The extended European search report of corresponding European application No. 23189288.6 dated Sep. 15, 2023.
International Search Report (ISR) dated Nov. 25, 2019 for Application No. PCT/CN2019/075291.
Hyunsoo Ko: "LS on UE-UE CLI measurement and reporting",3GPP TSG RAN WG1 Ad-Hoc Meeting 1901, R1-1901405, Jan. 25, 2019(Jan. 25, 2019), entire document.
Written Opinion of the International Searching Authority in International Application No. PCT/CN2019/075291, mailed on Nov. 25, 2019 with English translation provided by Google Translate.
The EESR of corresponding European application No. 19915563.1 dated Jan. 19, 2022.
Intel Corporation:"UE-to-UE CLI measurement and reporting", 3GPP Draft; R1-1900489, 3rd Generation Partnership Project (3GPP), Mobile Competence Centre; 650, Route Des Lucioles; F-06921 Sophia-Antipolis Cedex; France, vol. RAN WG1, No. Taipei: Jan. 21, 2019-Jan. 25, 2019 Jan. 12, 2019(Jan. 12, 2019), XP051576097, entire document.
The first Office Action of corresponding Indian application No. 202117036087, dated Mar. 25, 2022.

* cited by examiner

WIRELESS COMMUNICATION METHOD, TERMINAL DEVICE AND NETWORK DEVICE

CROSS-REFERENCE TO RELATED APPLICATION

This application is a continuation of the International application PCT/CN2019/075291, filed on Feb. 15, 2019, entitled "WIRELESS COMMUNICATION METHOD, TERMINAL DEVICE AND NETWORK DEVICE", the content of which is hereby incorporated by reference in its entirety.

TECHNICAL FIELD

Embodiments of the present application relate to the technical field of communication and, in particular, relate to a wireless communication method, a terminal device and a network device.

BACKGROUND

In a wireless communication system, interference is always an important problem that puzzles a terminal device. For example, if adjacent user equipments (User Equipment, UE) belonging to different base stations adopt the same uplink and downlink configuration, one UE may be interfered by a signal sent by other base stations. For another example, if different uplink and downlink configurations are adopted by adjacent UEs, the uplink and downlink transmissions of adjacent UEs may be out of sync, which may cause a UE performing downlink receiving to be interfered by a UE performing uplink transmission. However, there is no clear solution focusing on how to measure the interference.

SUMMARY

Embodiments of the present application provide a wireless communication method, a terminal device and a network device, which can implement interference measurement.

In a first aspect, a wireless communication method is provided, the method includes:
  receiving, by a terminal device, first configuration information, the first configuration information including m pieces of resource indication information, where a resource indicated by the m pieces of resource indication information is used for performing sounding reference signal (Sounding Reference Signal, SRS)-based reference signal receiving power (Reference Signal Receiving Power, RSRP) measurement and/or received signal strength indication (Received Signal Strength Indication, RSSI) measurement, and m is a positive integer greater than or equal to 1; and
  performing, by the terminal device, the SRS-based RSRP measurement and/or the RSSI measurement on the resource indicated by the m pieces of resource indication information.

In a second aspect, a wireless communication method is provided, the method includes:
  sending, by a network device, first configuration information, the first configuration information including m pieces of resource indication information, where a resource indicated by the m pieces of resource indication information is used for performing SRS-based RSRP measurement and/or RSSI measurement, and m is a positive integer greater than or equal to 1.

In a third aspect, a terminal device is provided, and configured to execute the method in the above first aspect or each implementation thereof.

Specifically, the terminal device includes a functional module for executing the method in the above first aspect or each implementation thereof.

In a fourth aspect, a network device is provided, and configured to execute the method in the above second aspect or each implementation thereof.

Specifically, the network device includes a functional module for executing the method in the above second aspect or each implementation thereof.

In a fifth aspect, a terminal device is provided, including a processor and a memory. The memory is configured to store a computer program, and the processor is configured to call and run the computer program stored in the memory to execute the method in the above first aspect or each implementation thereof.

A sixth aspect, a network device is provided, including a processor and a memory. The memory is configured to store a computer program, and the processor is configured to call and run the computer program stored in the memory to execute the method in the above second aspect or each implementation thereof.

A seventh aspect, a chip is provided, and configured to implement the method of any one of the above first aspect to the above second aspect or each implementation thereof.

Specifically, the chip includes: a processor, configured to call and run a computer program from the memory, so that a device stalled with the chip executes the method of any one of the above first aspect to the above second aspect or each implementation thereof.

An eighth aspect, a computer-readable storage medium is provided, configured to store a computer program, where the computer program causes a computer to execute the method of any one of the above first aspect to the above second aspect or each implementation thereof.

A ninth aspect, a computer program product is provided, including computer program instructions, the computer program instructions causes a computer to execute the method of any one of the above first aspect to the above second aspect or each implementation thereof.

A tenth aspect, a computer program is provided, the computer program, when running on the computer, causes a computer to execute the method of any one of the above first aspect to the above second aspect or each implementation thereof.

Through the above technical solutions, the terminal device can perform the SRS-based RSRP measurement and/or the RSSI measurement based on the m pieces of resource indication information configured by the network device, thus realizing interference measurement.

DETAILED DESCRIPTION OF EMBODIMENTS

The technical solutions in embodiments of the present application will be described below in conjunction with the drawings in the embodiments of the present application. Obviously, the described embodiments are a part of the embodiments of the present application, not all of the embodiments. For the embodiments in the present application, all other embodiments obtained by those of ordinary skill in the art without paying creative effort shall fall within the protection scope of the present application.

The embodiments of the present application can be applied to various communication systems, such as: a global system of mobile communication (Global System of Mobile communication, GSM) system, a code division multiple access (Code Division Multiple Access, CDMA) system, a wideband code division multiple access (Wideband Code Division Multiple Access, WCDMA) system, a general packet radio service (General Packet Radio Service GPRS), a long term evolution (Long Term Evolution, LTE) system, an advanced long term evolution (Advanced long term evolution, LTE-A, LTE-A) system, a new radio (NR New Radio, NR) system, an NR evolution system, a LTE-based access to unlicensed spectrum (LTE-based access to unlicensed spectrum, LTE-U) system, a NR-based access to unlicensed spectrum (NR-U NR-based access to unlicensed spectrum, NR-U) system, a universal mobile telecommunication system (Universal Mobile Telecommunication System, UMTS) system, a wireless local area network (Wireless Local Area Networks, WLAN), wireless fidelity (Wireless Fidelity, WiFi), a next generation communication system or other communication systems, etc.

Generally speaking, a traditional communication system supports a limited number of connections and is easy to implement. However, with the development of communication technologies, a mobile communication system will not only support traditional communication, but will also support, for example, device to device (Device to Device, D2D) communication, machine to machine (Machine to Machine, M2M) communication, machine type communication (Machine Type Communication, MTC), and vehicle to vehicle (Vehicle to Vehicle, V2V) communication, etc. The embodiments of the present application can also be applied to these communication systems.

In an implementation, the communication system in the embodiments of the present application can be applied to a carrier aggregation (Carrier Aggregation, CA) scenario, and can also be applied to a dual connectivity (Dual Connectivity, DC) scenario, can also be applied to a standalone (Standalone, SA) deployment network scenario.

The embodiments of the present application do not limit an applied frequency spectrum. For example, the embodiments of the present application can be applied to a licensed spectrum or an unlicensed spectrum.

Figure 1:
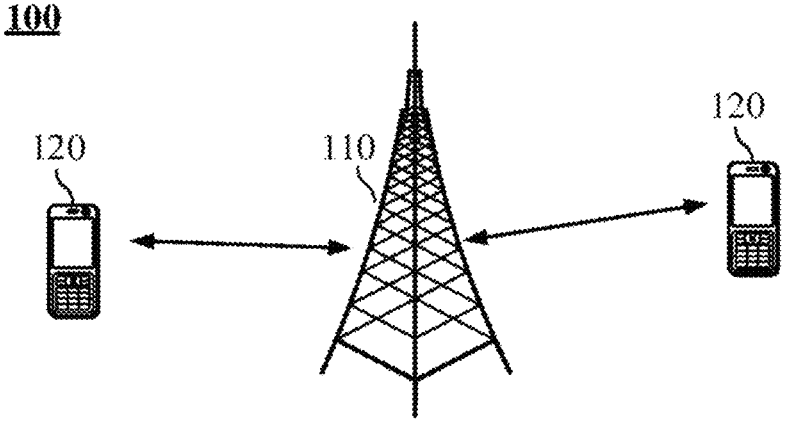
FIG. 1 is a schematic diagram of a communication system architecture provided by an embodiment of the present application.

Exemplarily, a communication system 100 of the embodiments of the present application is shown in FIG. 1. The communication system 100 may include a network device 110, and the network device 110 may be a device in communication with a terminal device 120 (or called a communication terminal, terminal). The network device 110 can provide communication coverage for a specific geographic area, and can communicate with a terminal device located in the coverage area.

FIG. 1 exemplarily shows one network device and two terminal devices. In an implementation, the communication system 100 may include a plurality of network devices and a coverage of each network device may include other numbers of terminal devices, which is not limited in the embodiments of the present application.

In an implementation, the communication system 100 may also include other network entities, such as a network controller, a mobility management entity, which is not limited in the embodiments of the present application.

It should be understood that the device with a communication function in the network/system in the embodiments of the present application may be referred to as a communication device. Taking the communication system 100 shown in FIG. 1 as an example, the communication device may include the network device 110 and the terminal device 120 with the communication function, and the network device 110 and the terminal device 120 may be a specific device described above, which will not be repeated here. The communication device may also include other devices in the communication system 100, for example, other network entities such as a network controller, a mobility management entity, etc., which are not limited in the embodiments of the present application.

It should be understood that the terms "system" and "network" are often used interchangeably herein. The term "and/or" herein is only an association relationship for describing associated objects, and means that there can be three types of relationships. For example, the expression "A and/or B" may indicate three cases: A exists alone, A and B exist at the same time, and B exists alone. In addition, the character "/" herein generally indicates that the associated objects before and after the character are in an "or" relationship.

The embodiments of the present application describe various embodiments in conjunction with the terminal device and network device, where the terminal device can refer to a user equipment (User Equipment, UE), an access terminal, a user unit, a user station, a mobile station, a mobile platform, a remote station, a remote terminal, a mobile device, a user terminal, a terminal, a wireless communication device, a user agent or a user apparatus. The terminal device can be a station (STATION, ST), a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device with a wireless communication function, a computing device with a wireless communication function, or other processing devices connected to a wireless modem and having a wireless communication function, an in-vehicle device, a wearable device or a terminal device in a next generation communication system, such as a NR network or a terminal in a future evolutional public land mobile network (Public Land Mobile Network, PLMN), etc.

By way of example but not limitation, in the embodiments of the present application, the terminal device may also be a wearable device. The wearable device can also be called a wearable smart device, which is a general term for using a wearable technology to intelligently design an everyday wear and develop a wearable device, such as glasses, gloves, a watch, clothing and a shoe. The wearable device is a portable device that is worn directly on a body or integrated into a cloth or accessories of a user. The wearable device is not only a hardware device, but also realizes a powerful function through software support, data interaction and cloud interaction. In a broad sense, wearable smart devices include, for example, smart watches or smart glasses or the like which have full functions, with large sizes, and can realize complete or partial functions without relying on smart phones, as well as devices which simply focus on a certain application function and need to be used in conjunction with other devices such as smart phones, such as various smart bracelets for monitoring physical signs and smart jewelries for monitoring physical signs.

The network device may be a device used to communicate with a mobile device. The network device may be an access point (Access Point, AP) in a WLAN, a base station (Base Transceiver Station, BTS) in GSM or CDMA, or a base station (NodeB, NB) in WCDMA, or an evolved base station (Evolutional Node B, eNB or eNodeB) in LTE, or a relay station or an access point, or in-vehicle device, a wearable device and a network device (gNB) in a NR network or a network device in a future evolutional PLMN network, etc.

In the embodiments of the present application, the network device provides service for a cell, the terminal device communicates with the network device thought a transmission resource (e.g., a frequency domain resource or a spectrum resource) used by the cell. The cell may be a cell corresponding to the network device (e.g., a base station), and the cell may belong to a macro base station or a base station corresponding to a small cell. The small cell here can include: a metro cell, a microcell, a pico cell, a femto cell, etc. These small cells have the characteristics of small coverage and low transmission power, and are suitable for providing a high-speed data transmission service.

Different services or applications (Application, APP) of the terminal device may have different requirements in terms of uplink data rate and downlink data rate. For example, when watching a movie using a mobile phone, the downlink data rate is generally higher than the uplink data rate. On the contrary, the uplink data rate of some services/apps may be higher than the downlink data rate thereof. For example, when backing up local data to the cloud, the uplink data rate is higher than the downlink data rate. For the same service/APP, different operations may have different requirements for the uplink data rate and the downlink data rate. For example, when uploading videos for sharing, the uplink data rate may be higher than the downlink data rate, while watching videos shared by friends, the uplink data rate may be lower than the uplink data rate.

Based on the above actual service/APP situation, if a wireless network keeps fixed or semi-static (semi-static) uplink resource allocation and downlink resource allocation (for example, fixed uplink time slot configuration and downlink time slot configuration in LTE/NR system), service transmission may not be optimally matched in a short time, thus resulting in inefficient utilization of a resource and a problem that experience of the terminal device cannot be further improved.

In order to solve the above problem, a method of dynamically adjusting an uplink transmission direction and a downlink transmission direction (a transmission resource) can be adopted. For example, if the amount of downlink data of the current cell or the terminal device increases, the network device can use more resources for downlink transmission (for example, more time slots are used for the downlink transmission).

NR system proposes a flexible time slot format, in which the time slot format includes several downlink symbols, several flexible symbols and several uplink symbols in a time slot.

A NR system proposes a flexible time slot format, where the time slot format includes information about several downlink symbols, several flexible symbols, and several uplink symbols in a time slot.

The configuration of some time slot formats supported in the current NR protocol can be shown in Table 1. In Table 1, one row represents a time slot. It can be seen that there are 14 symbols in each time slot. "D" represents a downlink (Downlink) symbol in Table 1, "U" represents an uplink (Uplink) symbol, and "F" represents a flexible symbol. It can be seen that a slot format 0 indicates that all 14 symbols in a slot are downlink symbols, a slot format 1 indicates that all 14 symbols in a slot are uplink symbols, and a slot format 20 indicates that the first 2 symbols are configured as downlink symbols, the last symbol is configured as an uplink symbol, and the middle 11 symbols are configured as flexible symbols.

TABLE 1

| Time slot format | The indices of symbols in the time slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |

If a cell changes the time slot format in a relatively dynamical manner, or the network device changes its corresponding time slot format for one or some terminal devices, additional interference (relative to static uplink configuration and downlink configuration) would be caused.

Figure 2:
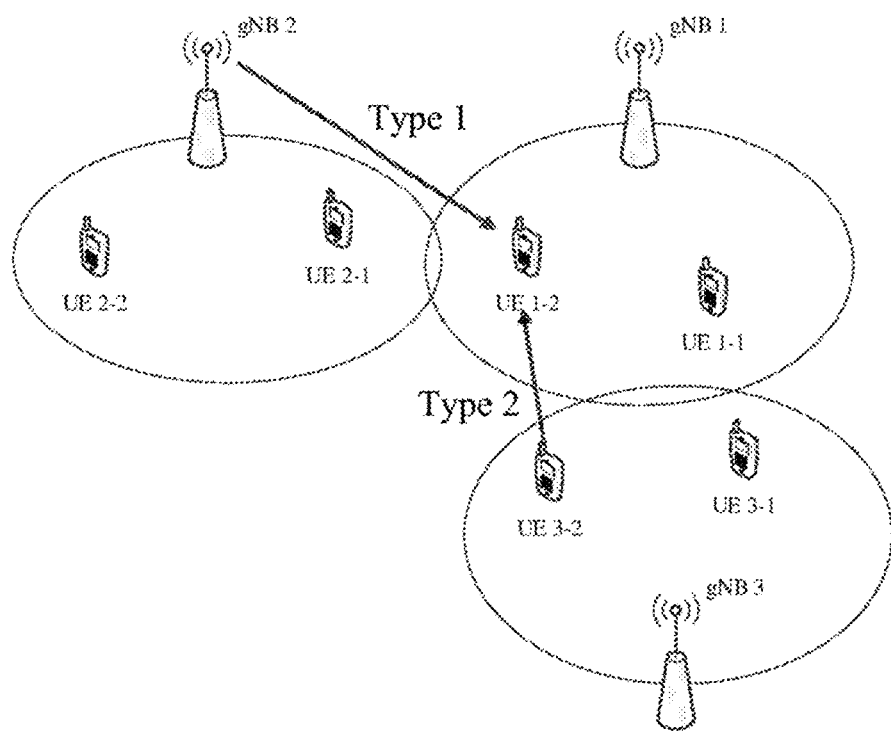
FIG. 2 is a schematic diagram of downlink reception interference of a terminal device provided by an embodiment of the present application.

Take FIG. 2 as an example for illustration. If neighboring cells all use the same uplink and downlink configuration, when UE 1-2 receives a downlink signal, other cells are also performing downlink signal transmission (if any), there will be no uplink signal transmission, so UE 1-2 may only receive interference from other base stations (for example, a type 1 interference in the figure).

If relatively dynamic uplink and downlink configuration is supported, for example, a current service of UE 3-2 is mainly a large amount of upload data traffic, and a base station 3 may configure more uplink resources (for example, more time slots are configured as full uplink, or more symbols in some time slots are configured as uplink) for the transmission of UE 3-2, if the uplink transmission and downlink transmission of UE 1-2 and UE 3-2 are different, additional interference may be formed, for example, a type 2 interference shown in the figure, that is, when receiving downlink data transmission, UE 1-2 may be interfered by an uplink signal sent by the neighboring UE 3-2.

In addition, if the time slot format does not change, the type 2 interference may also be occur. For example, all symbols in a time slot are flexible symbols (such as a time slot format 2 in Table 1), gNB1 may use the time slot for downlink transmission of UE 1-2, at this time, gNB3 may use the time slot for uplink transmission of UE 3-2, the above-mentioned type 2 interference will also occur.

Therefore, in order to ensure the performance of a system or a terminal device, it is necessary to measure the interference of the terminal device to recognize an interference source.

It should be understood that the method of the embodiments of the present application can be applied to cross-link interference (Cross-Link Interference, CLI) measurement, for example, CLI can be interference caused by uplink transmission of at least one terminal device to receiving of a neighboring terminal device. It should be understood that the CLI measurement is not limited to between terminals, but can also be used in other similar situations, such as between network devices.

A measured value or a reported value measured by the CLI measurement can be in two ways: channel sounding reference signal-reference signal received power (Sounding Reference Signal-Reference Signal Received Power, SRS-RSRP) and received signal strength indicator (Received Signal Strength Indicator, RSSI).

Among them, the SRS-RSRP is SRS-based RSRP, i.e., an RSRP value is obtained by measuring an SRS. The network device can configure an SRS for SRS-RSRP measurement of the terminal device. Information configured by the network device can include, but is not limited to, the following information: a time-frequency resource, a SRS sequence, a cyclic shift, and a measurement period for measuring the SRS by the terminal device. With regard to the RSSI, the network device can configure a set of time-frequency resources for the RSSI measurement at the terminal device, where the configuration can include a symbol level indication and a physical resource block (Physical Resource Block, PRB) level indication.

It should be understood that if a measurement quantity is the RSSI, the measurement of the terminal device is simple, however, different interference sources cannot be distinguished; or, in order to recognize the interference source, a signaling overhead is too high.

In addition, the method of the embodiments of the present application can also be applied to other scenarios, such as interference from other network devices to the terminal device, interference between neighboring cells, or the type 1 interference mentioned above, and so on.

An interference measurement scheme designed for the above technical problems in the present application is described in detail below.

Figure 3:
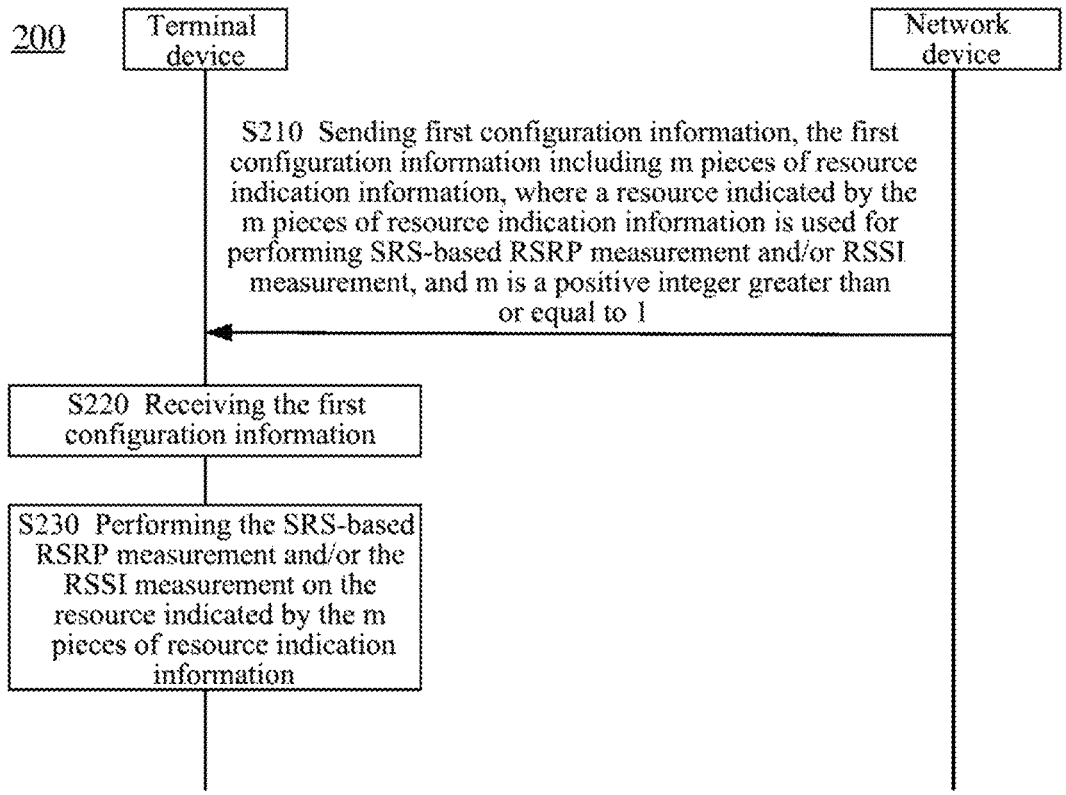
FIG. 3 is a schematic flowchart of a wireless communication method according to an embodiment of the present application.

FIG. 3 is a schematic flowchart of a wireless communication method 200 according to an embodiment of the present application, as shown in FIG. 3, the method 200 can include the following:

S210: a network device sends first configuration information to a terminal device, the first configuration information including m pieces of resource indication information, where a resource indicated by the m pieces of resource indication information is used for performing SRS-based RSRP measurement and/or RSSI measurement, and m is a positive integer greater than or equal to 1;

S220: the terminal device receives the first configuration information; and

S230: the terminal device performs the SRS-based RSRP measurement and/or the RSSI measurement on the resource indicated by the m pieces of resource indication information.

In an implementation, in the embodiment of the present application, each of the m pieces of resource indication information is used for indicating at least one or at least one set of SRS resource information and/or time-frequency resource information, where a resource indicated by the SRS resource information is used for performing the SRS-based RSRP measurement, a resource indicated by the time-frequency resource information is used for performing the RSSI measurement.

In an implementation, the SRS resource information and the time-frequency resource information can be configured in one measurement object information element (Information Element, IE). That is, different resource configurations can be completed in one measurement object IE, thus reducing configuration signaling overheads.

In an implementation, the SRS resource information and the time-frequency resource information can be configured by multiplexing an existing measurement object IE, e.g., multiplex an existing measurement object IE (with a structure of MeasObjectNR), it should be noted that the multiplexing of the existing measurement object IE to configure the SRS resource information and the time-frequency resource information can reduce standardization work.

Therefore, one measurement object configuration can complete measurement for different purposes, thus reducing configuration signaling overheads.

In an implementation, one measurement object IE includes a configuration field for mobility measurement configuration, and the configuration field further includes configuration information corresponding to the SRS resource information and/or the time-frequency resource information.

Example 1, the following structure of MeasObjectNR includes a reference signal configuration field (ReferenceSignalConfig) for mobility measurement configuration. And the ReferenceSignalConfig field al so includes the configuration information corresponding to the SRS resource information and/or the time-frequency resource information. Of course, the structure of MeasObjectNR can also include some other fields, and only the field information related to the present application is displayed as follows.

```
MeasObjectNR ::=                    SEQUENCE {
    ...
    referenceSignalConfig           ReferenceSignalConfig,
    ...
}
ReferenceSignalConfig::=            SEQUENCE {
    ssb-ConfigMobility                  SSB-ConfigMobility
        OPTIONAL, -- Need M
    csi-rs-ResourceConfigMobility       SetupRelease { CSI-RS-ResourceConfigMobility }
        OPTIONAL -- Need M
    SRS resource information            OPTIONAL for the SRS-based RSRP measurement
    Time-frequency resource information OPTIONAL for the RSSI measurement
}
```

It should be noted that if the SRS resource information is optional (OPTIONAL) configuration information, the SRS resource information may not be included in the configuration of the ReferenceSignalConfig structure. Similarly, if the time-frequency resource information is optional configuration information, the time-frequency resource information may not be included in the configuration of the ReferenceSignalConfig structure.

In an implementation, one measurement object IE includes a first configuration field for mobility measurement configuration, and the measurement object IE further includes a second configuration field, the second configuration field includes configuration information corresponding to the SRS resource information and/or the time-frequency resource information.

In an implementation, a sequence (SEQUENCE) structure or a choice (CHOICE) structure in the second configuration field carries the configuration information corresponding to the SRS resource information and/or the time-frequency resource information.

Example 2, the following structure of MeasObjectNR includes a reference ReferenceSignalConfig for mobility measurement configuration, and the structure of MeasObjectNR also includes a ReferenceSignalConfig2 field, the ReferenceSignalConfig2 field includes the configuration information corresponding to the SRS resource information and/or the time-frequency resource information. Of course, the structure of MeasObjectNR also includes some other fields, and only the field information related to the present application is displayed as follows.

It should be noted that if the SRS resource information is optional configuration information, the SRS resource information may not be included in the configuration of the above-mentioned ReferenceSignalConfig structure. Similarly, if the time-frequency resource information is optional configuration information, the time-frequency resource information may not be included in the configuration of the above-mentioned ReferenceSignalConfig structure.

In an implementation, the SRS resource information and the time-frequency resource information can be configured by using a newly defined measurement object IE.

In an implementation, one measurement object IE only includes configuration information corresponding to the SRS resource information and/or the time-frequency resource information. That is, this measurement object IE is a newly defined measurement object IE for the SRS resource information and/or the time-frequency resource information. In an implementation, a sequence structure or a choice structure in the measurement object IE carries the configuration information corresponding to the SRS resource information and/or the time-frequency resource information. It should be noted that configuring the SRS resource information and/or the time-frequency resource information based on the newly field measurement object IE can save some unnecessary reporting quantities and thus reduce resources required for reporting, and at the same time, the signaling becomes simpler.

Example 3, the following structure of MeasObjectNRCLI (a newly defined measurement object IE) includes the con-

```
MeasObjectNR ::=                    SEQUENCE {
    ...
    referenceSignalConfig           ReferenceSignalConfig,
    ...
}
ReferenceSignalConfig::=            SEQUENCE {
    ssb-ConfigMobility              SSB-ConfigMobility
        OPTIONAL, -- Need M
    csi-rs-ResourceConfigMobility   SetupRelease { CSI-RS-ResourceConfigMobility }
        OPTIONAL -- Need M
}
ReferenceSignalConfig2::=           SEQUENCE {
    SRS resource information            OPTIONAL for the SRS-based RSRP measurement
    Time-frequency resource information OPTIONAL for the RSSI measurement
}
    or
ReferenceSignalConfig2::=           CHOICE {
    SRS resource information            OPTIONAL for the SRS-based RSRP measurement
    Time-frequency resource information OPTIONAL for the RSSI measurement
}
``` figuration information corresponding to the SRS resource information and/or the time-frequency resource information.

```
MeasObjectNRCLI ::=                 SEQUENCE {
Measurement resource name           Measurement resource type,
}
Or use SEQUENCE structure
ReferenceSignalConfig2::=           SEQUENCE {
SRS resource information            OPTIONAL for the SRS-based RSRP measurement
Time-frequency resource information OPTIONAL for the RSSI measurement
}
Or use choice structure
ReferenceSignalConfig2::=           CHOICE {
SRS resource information            for the SRS-based RSRP measurement
Time-frequency resource information for the RSSI measurement
}
Use SEQUENCE structure
MeasObjectNRCLI ::=                 SEQUENCE {
Measurement resource name           SEQUENCE }
SRS resource information            OPTIONAL for the SRS-based RSRP measurement
Time-frequency resource information OPTIONAL for the RSSI measurement
},
. . .
}
Or use choice structure
   MeasObjectNRCLI ::=              SEQUENCE {
Measurement resource name           CHOICE {
SRS resource information            for the SRS-based RSRP measurement
Time-frequency resource information for the RSSI measurement
},
. . .
}
```

It should be noted that if the SRS resource information is optional configuration information, the SRS resource information may not be included in the configuration of the above-mentioned ReferenceSignalConfig2 structure or the configuration of SEQUENCE structure. Similarly, if the time-frequency resource information is optional configuration information, the time-frequency resource information may not be included in the configuration of the ReferenceSignalConfig2 structure or the configuration of SEQUENCE structure.

In an implementation, the SRS resource information and the time-frequency resource information cannot be configured in one measurement object IE. That is, the SRS resource information and the time-frequency resource information need to be configured in different measurement object IEs, the way in which the configuration is done in different measurement object IEs can reduce processing complexity of the terminal device.

Therefore, using different measurement object configurations for different measurements can decouple different measurements and thus reduce reporting overheads.

In an implementation, in an embodiment of the present application, the configuration information corresponding to the SRS resource information and/or the time-frequency resource information is optional configuration information.

In an implementation, in an embodiment of the present application, the first configuration information further includes cell indication information, the cell indication information is used for indicating a cell corresponding to the resource indicated by the m pieces of resource indication information, that is, the configuration information includes the m pieces of resource indication information and the cell indication information.

It should be noted that when the first configuration information includes the m pieces of resource indication information and the cell indication information, when the terminal device operates with multi-carrier (Carrier Aggregation (Carrier Aggregation, CA)) or multiple connectivity (multiple connectivity, where double link is a special form), it can be flexibly indicated that the measurement is performed on a corresponding resource of which serving cell (serving cell), thus providing better flexibility for network cooperation.

In an implementation, as Example 4, the first configuration information specifically only includes one piece of cell indication information, and a cell indicated by the one piece of cell indication information corresponds to the resource indicated by the m pieces of resource indication information.

In an implementation, as Example 5, the first configuration information specifically includes m pieces of cell indication information, and a cell indicated by i-th cell indication information corresponds to a resource indicated by i-th resource indication information, $0<i \leq m$.

Figure 4:
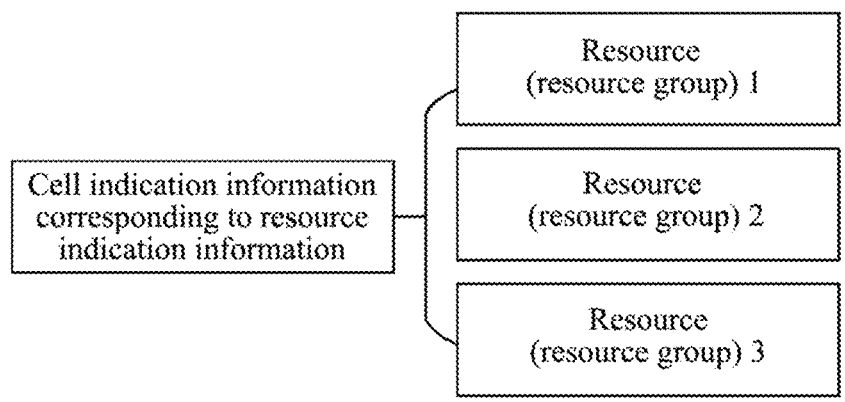
FIG. 4 is a schematic diagram of first configuration information according to an embodiment of the present application.

In an implementation, in Example 5, the m pieces of resource indication information and the m pieces of cell indication information correspond to a first IE, and the a first field in the first IE includes the m pieces of resource indication information and the m pieces of cell indication information For example, as shown in FIG. 4, assume that m=1, that is, the resource indication information and the cell indication information corresponds to the first IE, the resource indication information indicates three resource (or a resource group), they are marked as a resource (a resource group) 1 to a resource (a resource group) 3, the first field (e.g., ReferenceSignalConfig field) in the first IE indicates the resource (the resource group) 1 to the resource (the resource group) 3.

In an implementation, in Example 5, the m pieces of resource indication information and the m pieces of cell indication information correspond to the first IE, and the first field in the first IE includes a first sequence structure for the m pieces of resource indication information and a second sequence structure for the m pieces of cell indication information, where the first sequence structure includes m first elements, and an i-th first element corresponds to i-th resource indication information, the second sequence structure includes m second elements, and an i-th second element corresponds to i-th cell indication information.

That is, one field in the first IE may include the first sequence structure and the second sequence structure.

Figure 5:
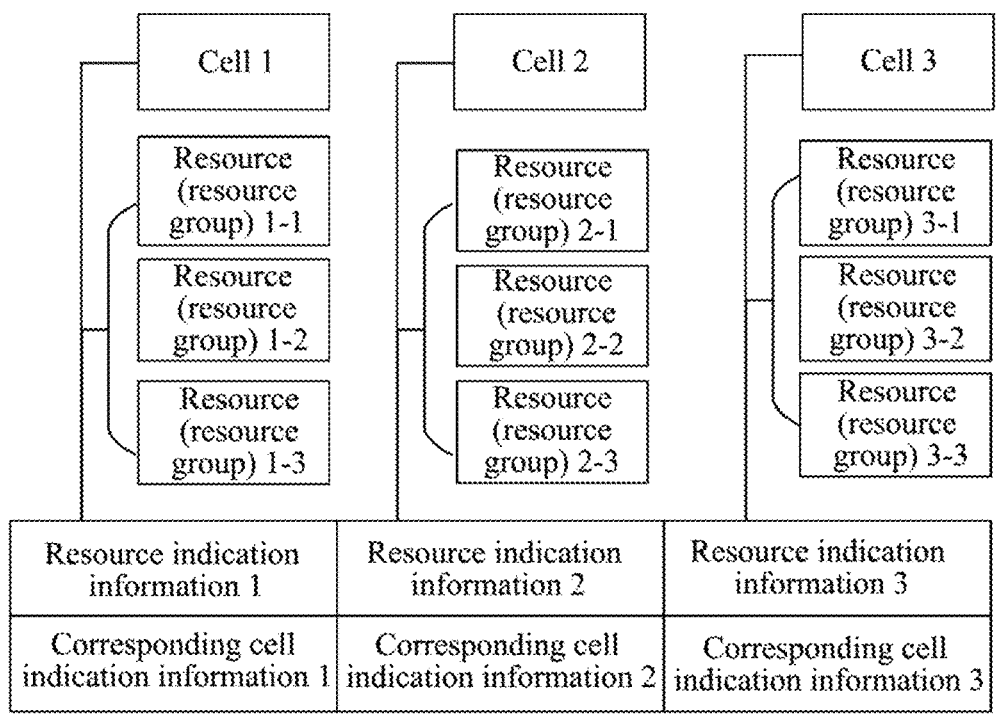
FIG. 5 is another schematic diagram of first configuration information according to an embodiment of the present application.

For example, as shown in FIG. 5, the m pieces of resource indication information and the m pieces of cell indication information correspond to a first IE, assume that m=3, that is, resource indication information 1 is used for indicating three resources (or resource groups), they are marked as a resource (a resource group) 1-1 to a resource (a resource group) 1-3, resource indication information 2 is used for indicating three resources (or resource groups), they are marked as a resource (a resource group) 2-1 to a resource (a resource group) 2-3, resource indication information 3 is used for indicating three resources (or resource groups), they are marked as a resource (a resource group) 3-1 to a resource (a resource group) 3-3, and the resource indication information 1 corresponds to the cell indication information 1, the resource indication information 2 corresponds to the cell indication information 2, the resource indication information 3 corresponds to the cell indication information 3, and the first field in the first IE can indicate a resource (or a resource group), meanwhile, the first field may also indicate a cell.

In an implementation, in Example 5, the m pieces of resource indication information and the m pieces of cell indication information correspond to the first IE, and the first field in the first IE includes a first sequence structure for the m pieces of resource indication information, a second field in the first IE includes a second sequence structure for the m pieces of cell indication information, where the first sequence structure includes m first elements, and an i-th first element corresponds to i-th resource indication information, the second sequence structure includes m second elements, and an i-th second element corresponds to i-th cell indication information.

Figure 6:
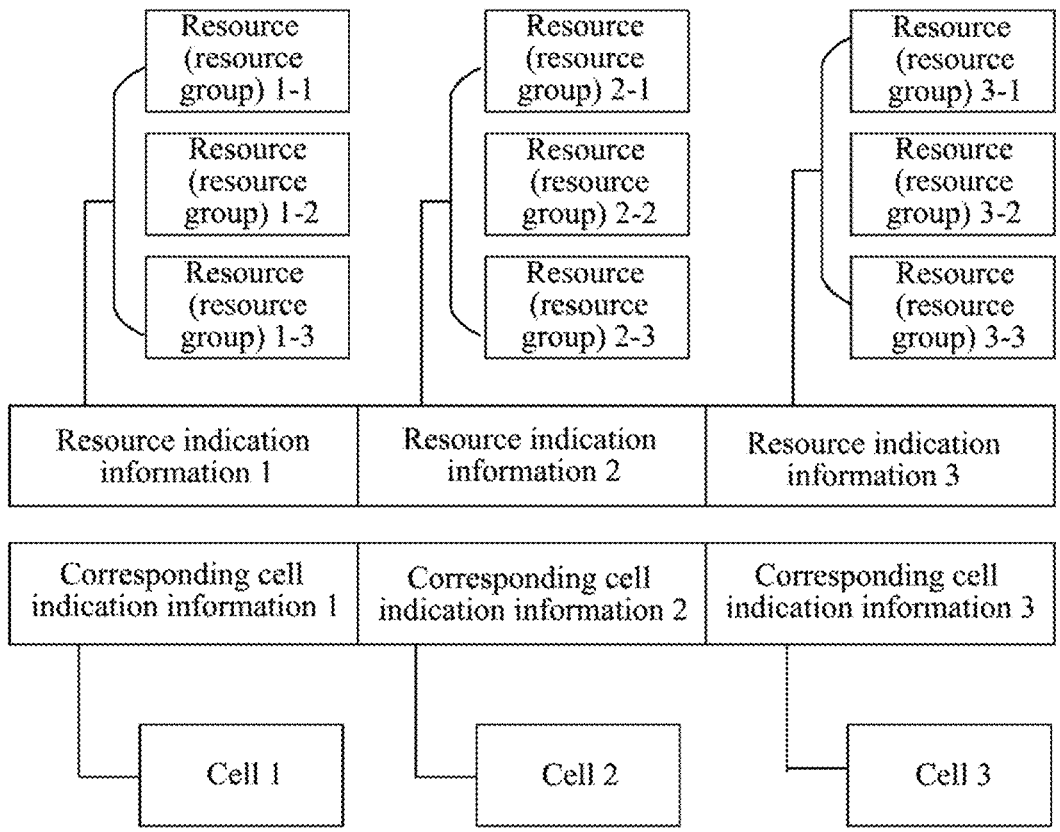
FIG. 6 is another schematic diagram of first configuration information according to an embodiment of the present application.

For example, as shown in FIG. 6, the m pieces of resource indication information and the m pieces of cell indication information correspond to a first IE, assume that m=3, that is, resource indication information 1 is used for indicating three resources (or resource groups), they are marked as a resource (a resource group) 1-1 to a resource (a resource group) 1-3, resource indication information 2 is used for indicating three resources (or resource groups), they are marked as a resource (a resource group) 2-1 to a resource (a resource group) 2-3, resource indication information 3 is used for indicating three resources (or resource groups), they are marked as a resource (a resource group) 3-1 to a resource (a resource group) 3-3, and the resource indication information 1 corresponds to the cell indication information 1, the resource indication information 2 corresponds to the cell indication information 2, the resource indication information 3 corresponds to the cell indication information 3, and the first field in the first IE can indicate a resource (or a resource group), meanwhile, the second field in the first IE may also indicate a cell.

In an implementation, in Example 5, the m pieces of resource indication information and the m pieces of cell indication information correspond to the first IE, and the first field in the first IE includes a first sequence structure for the m pieces of resource indication information and the m pieces of cell indication information, where the first sequence structure includes m elements, and an i-th element corresponds to i-th resource indication information and i-th cell indication information.

Figure 7:
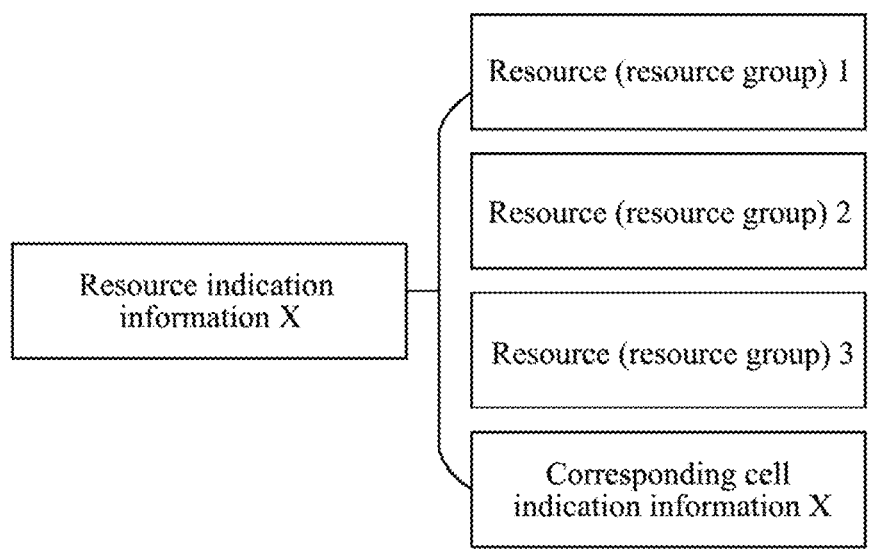
FIG. 7 is another schematic diagram of first configuration information according to an embodiment of the present application.

For example, as shown in FIG. 7, the m pieces of resource indication information and the m pieces of cell indication information correspond to a first IE, assume that m=1, the resource indication information X indicates three resources (or resource groups), they are marked as a resource (a resource group) 1 to a resource (a resource group) 3, the first field in the first IE indicates the resource (the resource group) 1 to the resource (the resource group) 3 and cell indication information X corresponding to the resource indication information X.

In an implementation, in the embodiment of the present application, if the first configuration information includes a field corresponding to cell indication information, and the cell indication information is not configured, a default cell corresponds to the resource indicated by the m pieces of resource indication information.

In an implementation, in the embodiment of the present application, if the first configuration information does not include a field corresponding to cell indication information, a default cell corresponds to the resource indicated by the m pieces of resource indication information.

In an implementation, the default cell includes but not limited to at least one of the following:
a cell in all serving NR cells of the terminal device at present;
all cells in all serving NR cells of the terminal device at present;
a primary cell in a primary cell group accessed by the terminal device at present, and the primary cell is a NR cell;
a primary cell in a secondary cell group accessed by the terminal device at present, and the primary cell is a NR cell;
in a dual-connection scenario, a primary cell in a secondary cell group accessed by the terminal device at present, and the primary cell is a NR cell;
a cell of which identification is largest or smallest in all serving cells of the terminal device at present;
a cell of which identification is largest or smallest in all serving NR cells of the terminal device at present; or,
a default cell configured by a network device.

In an implementation, if the default cell corresponds to the resource indicated by the m pieces of resource indication information, at the same time, the m pieces of resource indication information correspond to a first IE, and a first field in the first IE includes a first sequence structure, where the first sequence structure includes m elements, and an i-th element corresponds to i-th resource indication information.

Figure 8:
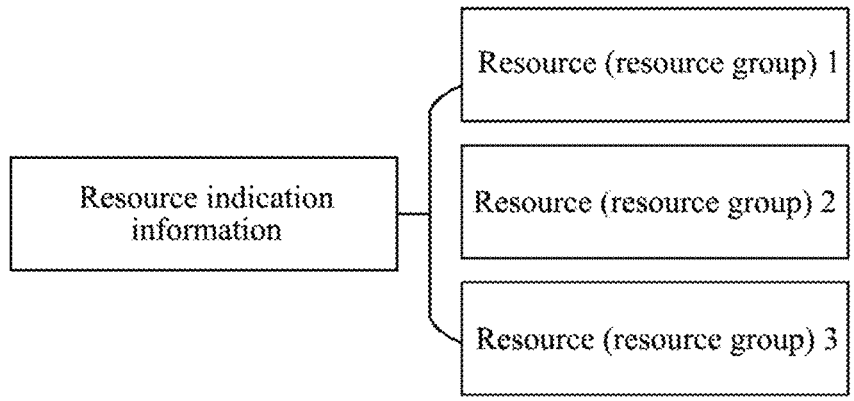
FIG. 8 is another schematic diagram of first configuration information according to an embodiment of the present application.

For example, as shown in FIG. 8, the m pieces of resource indication information correspond to a first IE, assume that m=1, the resource indication information indicates three resources (or resource groups), they are marked as a resource (a resource group) 1 to a resource (a resource group) 3, the first field in the first IE indicates the resource (the resource group) 1 to the resource (the resource group) 3.

In an implementation, if the default cell corresponds to the resource indicated by the m pieces of resource indication information, at the same time, the m pieces of resource indication information correspond to a first IE, m fields in the first IE correspond to the m pieces of resource indication information, where an i-th field corresponds to i-th resource indication information.

Figure 9:
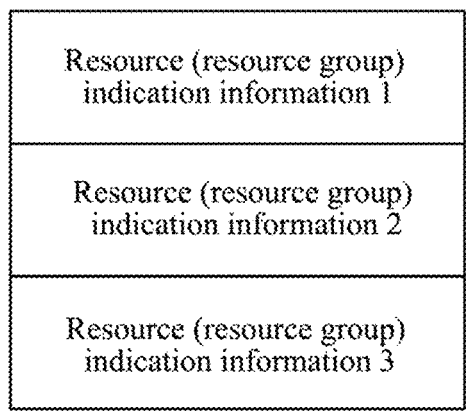
FIG. 9 is another schematic diagram of first configuration information according to an embodiment of the present application.

For example, as shown in FIG. 9, the m pieces of resource indication information correspond to a first IE, assume that m=1, the resource indication information indicates three resources (or resource groups), they are marked as a resource (a resource group) 1 to a resource (a resource group) 3, the first field in the first IE indicates the resource (the resource group) 1, a second field in the first IE indicates the resource (the resource group) 2, a third field in the first IE indicates the resource (the resource group) 3.

In an implementation, in the embodiment of the present application, one measurement object IE includes a configuration field for mobility measurement configuration, and the configuration field further includes configuration information corresponding to the cell indication information and/or the m pieces of resource indication information.

That is, the configuration information corresponding to the cell indication information and/or the m pieces of resource indication information can multiplex an existing measurement object IE, and only the configuration field for mobility measurement configuration needs to be modified. Specifically, reference may be made to the related description of Example 1 above, it is only necessary to replace the SRS resource information and/or the time-frequency resource information in Example 1 with the m pieces of resource indication information and/or the cell indication information, details are not repeated here.

In an implementation, in the embodiment of the present application, one measurement object IE includes a first configuration field for mobility measurement configuration, and the measurement object IE further includes a second configuration field, the second configuration field includes configuration information corresponding to the cell indication information and/or the m pieces of resource indication information. In an implementation, a sequence structure or a choice structure in the second configuration field carries the configuration information corresponding to the cell indication information and/or the m pieces of resource indication information.

That is, the configuration information corresponding to the cell indication information and/or the m pieces of resource indication information can multiplex an existing measurement object IE, and a field including the configuration information corresponding to the m pieces of resource indication information and/or the cell indication information needs to be added. Specifically, reference may be made to the related description of Example 2 above, it is only necessary to replace the SRS resource information and/or the time-frequency resource information in Example 2 with the m pieces of resource indication information and/or the cell indication information, details are not repeated here.

In an implementation, in the embodiment of the present application, one measurement object IE includes the configuration information corresponding to the cell indication information and/or the m pieces of resource indication information, and does not include configuration information for mobility measurement. A sequence structure or a choice structure in the measurement object IE carries the configuration information corresponding to the cell indication information and/or the m pieces of resource indication information.

That is, the configuration information corresponding to the cell indication information and/or the m pieces of resource indication information cannot multiplex an existing measurement object IE, and in particular, cannot multiplex the measurement object IE including the configuration information for mobility measurement. Specifically, reference may be made to the related description of Example 3 above, it is only necessary to replace the SRS resource information and/or the time-frequency resource information in Example 3 with the m pieces of resource indication information and/or the cell indication information, details are not repeated here.

In an implementation, in the embodiment of the present application, the configuration information corresponding to the m pieces of resource indication information and/or the cell indication information is (are) optional configuration information.

In an implementation, in the embodiment of the present application, the first configuration information further includes BWP indication information, the BWP indication information is used for indicating a BWP corresponding to the resource indicated by the m pieces of resource indication information.

Therefore, when the first configuration information further includes the BWP indication information, when configuring a plurality of BWPs in a serving cell, the terminal device can flexibly indicate that measurement is performed on a corresponding resource of which BWP or which BWPs, so as to provide better flexibility for network cooperation.

It should be noted that, at this time, the first configuration information may include the m pieces of resource indication information and the BWP indication information, and may also include the m pieces of resource indication information, the cell indication information and the BWP indication information.

In an implementation, as Example 6, the first configuration information specifically only includes one piece of BWP indication information, and a BWP indicated by the one piece of BWP indication information corresponds to the resource indicated by the m pieces of resource indication information.

In an implementation, as Example 7, the first configuration information specifically includes m pieces of BWP indication information, a BWP indicated by i-th BWP indication information corresponds to a downlink BWP indicated by i-th resource indication information, $0 < i \leq m$.

In an implementation, in Example 7, the m pieces of resource indication information and the m pieces of BWP indication information correspond to a second IE, and a first field in the second IE includes the m pieces of resource indication information and the m pieces of BWP indication information.

In particular, referring to the description about FIG. 4, it is only necessary to replace the cell indication information with the BWP indication information, for brevity, details are not repeated here.

In an implementation, in Example 7, the m pieces of resource indication information and the m pieces of BWP indication information correspond to a second IE, and a first field in the second IE includes a first sequence structure for the m pieces of resource indication information and a second sequence structure for the m pieces of BWP indication information, where the first sequence structure includes m first elements, and an i-th first element corresponds to i-th resource indication information, the second sequence structure includes m second elements, and an i-th second element corresponds to i-th BWP indication information.

In particular, referring to the description about FIG. 5, it is only necessary to replace the cell indication information with the BWP indication information, for brevity, details are not repeated here.

In an implementation, in Example 7, the m pieces of resource indication information and the m pieces of BWP indication information correspond to a second IE, and a first field in the second IE includes a first sequence structure for the m pieces of resource indication information, a second field in the second IE includes a second sequence structure for the m pieces of BWP indication information, where the first sequence structure includes m first elements, and an i-th first element corresponds to i-th resource indication information, the second sequence structure includes m second elements, and i-th second element corresponds to i-th BWP indication information.

In particular, referring to the description about FIG. 6, it is only necessary to replace the cell indication information with the BWP indication information, for brevity, details are not repeated here.

In an implementation, in Example 7, the m pieces of resource indication information and the m pieces of BWP indication information correspond to a second IE, and a first field in the second IE includes a first sequence structure for the m pieces of resource indication information and the m pieces of BWP indication information, where the first sequence structure includes m elements, and an i-th first element corresponds to i-th resource indication information and i-th BWP indication information.

In particular, referring to the description about FIG. 7, it is only necessary to replace the cell indication information with the BWP indication information, for brevity, details are not repeated here.

In an implementation, in the embodiment of the present application, if the first configuration information includes a field corresponding to BWP indication information, and the BWP indication information is not configured, a default downlink BWP corresponds to the resource indicated by the m pieces of resource indication information.

In an implementation, in the embodiment of the present application, if the first configuration information does not include a field corresponding to BWP indication information, a default downlink BWP corresponds to the resource indicated by the m pieces of resource indication information.

In an implementation, the default downlink BWP includes but not limited to at least one of:

an initial BWP in a cell corresponding to the m pieces of resource indication information;
an active BWP in a cell corresponding to the m pieces of resource indication information;
all BWPs in a cell corresponding to the m pieces of resource indication information;
one of all BWPs in a cell corresponding to the m pieces of resource indication information;
a BWP of which identification is largest or smallest in a cell corresponding to the m pieces of resource indication information; or,
a default downlink BWP configured by a network device.

In an implementation, if the default downlink BWP corresponds to the resource indicated by the m pieces of resource indication information, the m pieces of resource indication information correspond to a second IE, and a first field in the second IE includes a first sequence structure, where the first sequence structure includes m elements, and an i-th element corresponds to i-th resource indication information.

In particular, referring to the description about FIG. 8, for brevity, details are not repeated here.

In an implementation, if the default downlink BWP corresponds to the resource indicated by the m pieces of resource indication information, the m pieces of resource indication information correspond to a second IE, m fields in the second IE correspond to the m pieces of resource indication information, where an i-th field is used for indicating i-th resource indication information.

Specifically, referring to the description about FIG. 9, for brevity, details are not repeated here.

In an implementation, in the embodiment of the present application, one measurement object IE includes a configuration field for mobility measurement configuration, and the configuration field further includes configuration information corresponding to the BWP indication information and/or the m pieces of resource indication information.

That is, the configuration information of the BWP indication information and/or the m pieces of resource indication information can multiplex an existing measurement object IE, and only the configuration field for mobility measurement configuration in this measurement object IE needs to be modified, specifically, reference may be made to the related description of Example 1 above, it is only necessary to replace the SRS resource information and/or the time-frequency resource information in Example 1 with the m pieces of resource indication information and/or the BWP indication information, details are not repeated here.

In an implementation, in the embodiment of the present application, one measurement object IE includes a first configuration field for mobility measurement configuration, and the measurement object IE further includes a third configuration field, the third configuration field includes configuration information corresponding to the BWP indication information and/or the m pieces of resource indication information. In an implementation, a sequence structure or a choice structure in the third configuration field carries the configuration information corresponding to the BWP indication information and/or the m pieces of resource indication information.

That is, the configuration information corresponding to the BWP indication information and/or the m pieces of resource indication information can multiplex an existing measurement object IE, and a field including the configuration information corresponding to the BWP indication information and/or the m pieces of resource indication information needs to be added. Specifically, reference may be made to the related description of Example 2 above, it is only necessary to replace the SRS resource information and/or the time-frequency resource information in Example 2 with the m pieces of resource indication information and/or the BWP indication information, details are not repeated here.

In an implementation, in the embodiment of the present application, one measurement object IE includes configuration information corresponding to the BWP indication information and/or the m pieces of resource indication information, and does not include configuration information for mobility measurement. In an implementation, a sequence structure or a choice structure in the measurement object IE carries the configuration information corresponding to the BWP indication information and/or the m pieces of resource indication information.

That is, the configuration information corresponding to the BWP indication information and/or the m pieces of resource indication information cannot multiplex an existing measurement object IE, and in particular, cannot multiplex the measurement object IE including the configuration information for mobility measurement. Specifically, reference may be made to the related description of Example 3 above, it is only necessary to replace the SRS resource information and/or the time-frequency resource information in Example 3 with the m pieces of resource indication information and/or the BWP indication information, details are not repeated here.

In an implementation, in the embodiment of the present application, the configuration information corresponding to the BWP indication information and/or the m pieces of resource indication information is optional configuration information.

In an implementation, in the embodiment of the present application, if each of the resource indication information in the m pieces of resource indication information is used for indicating at least one or a set of SRS resource information, the SRS resource information includes an SRS sequence identification.

It should be noted that, since the SRS sequence identification or a cell identification is required for generation of the SRS sequence, the SRS resource information includes the SRS sequence identification, so as to ensure an SRS generation sequence.

In an implementation, in the embodiment of the present application, if each of the resource indication information in the m pieces of resource indication information is used for indicating at least one or a set of SRS resource information, and the first configuration information includes a field corresponding to an SRS sequence identification, and the SRS sequence identification is not configured, at this time, the network device can configure a cell identification corresponding to an SRS generation sequence to ensure the SRS generation sequence.

For example, the terminal device may receive second configuration information sent by the network device, where the second configuration information is used for indicating the cell identification corresponding to the SRS generation sequence.

It should be noted that, the first configuration information includes a field corresponding to the SRS sequence identification, and the SRS sequence identification is not configured, which can be understood as: the SRS sequence identification is optional configuration information.

In an implementation, in the embodiment of the present application, if each of the resource indication information in the m pieces of resource indication information is used for indicating at least one or a set of SRS resource information, and the first configuration information does not include a field corresponding to an SRS sequence identification, at this time, the network device can configure a cell identification corresponding to an SRS generation sequence to ensure the SRS generation sequence.

For example, the terminal device may receive second configuration information sent by the network device, where the second configuration information is used for indicating the cell identification corresponding to the SRS generation sequence.

It should be noted that, the first configuration information does not include the field corresponding to the SRS sequence identification, which can be understood as: the protocol does not support configuring the SRS sequence identification.

In an implementation, in the embodiment of the present application, the terminal device receives second configuration information, the second configuration information being used for indicating a cell identification corresponding to an SRS generation sequence, where,
- if the SRS resource information includes an SRS sequence identification, the SRS sequence identification corresponds to an initial parameter of an SRS generation sequence; or,
- if the SRS resource information does not include an SRS sequence identification, the cell identification corresponds to an initial parameter corresponding to an SRS generation sequence.

That is, if the network device has configured a cell identification corresponding to the SRS generation sequence, and the SRS resource information includes the SRS sequence identification, then the SRS sequence identification corresponds to an initial parameter of an SRS generation sequence, that is, the generation of the SRS sequence is performed based on the SRS sequence identification. If the network device has configured a cell identification corresponding to the SRS generation sequence, and the SRS resource information does not include the SRS sequence identification, then the cell identification corresponds to an initial parameter of an SRS generation sequence, that is, the generation of the SRS sequence generation is performed based on the cell identification.

In an implementation, the first configuration information and the second configuration information are carried in one radio resource control (Radio Resource Control, RRC) signaling.

It should be noted that, in the embodiment of the present application, before measurement reporting or being used for evaluation of a reporting criteria, a high-level needs to perform L3 filtering to obtain a measurement result needed to be reported, specifically, the L3 filtering can be performed with the following formula 1.

$$F_n = (1 - a) * F_{n-1} + a * M_n \qquad \text{Formula 1}$$

Among them, $M_n$ is the latest measurement result received from a physical layer; $F_n$ is the measurement result after filtering, which is used for reporting or evaluation of a reporting criteria; $F_{n-1}$ is the old (last time) filtered measurement result, where $F_0$ is set to $M_1$ when a measurement result is obtained from the physical layer for the first time; $a=\frac{1}{2}^{(k_i/4)}$, where $k_i$ is the filter coefficient corresponding to the measurement quantity.

In an implementation, in the embodiment of the present application, the terminal device filters a measurement result according to an L3 filter parameter, where the L3 filter parameter is preconfigured or configured by a network device. For example, the L3 filter parameter is 4.

It should be noted that, the L3 filter parameter is preconfigured, that is, a fixed L3 filter parameter is adopted, such as 4, in this way, the signaling overhead and the complexity of the terminal device can be reduced. The network device configures the L3 filter parameter to keep flexibility and set optimized parameters for different measurements to improve performance.

For example, the network device sends third configuration information to the terminal device, the third configuration information being used for configuring the L3 filter parameter.

In an implementation, the network device can respectively configure one set of L3 filter parameters.

For example, this set of L3 filter parameters correspond to two parameters (respectively corresponding to the SRS-RSRP and the RSSI);

For example, this set of L3 filter parameters correspond to one parameter (corresponding to the SRS-RSRP);

For example, this set of L3 filter parameters correspond to one or two parameters (i.e., configuration of the two parameters is optional).

In an implementation, the network device can respectively configure one set of or two sets of L3 filter parameters.

For example, each set of L3 filter parameters correspond to two parameters (respectively corresponding to the SRS-RSRP and the RSSI).

For another example, each set of L3 filter parameters correspond to one parameter (corresponding to the SRS-RSRP).

For another example, each set of L3 filter parameters correspond to one or two parameters (i.e., configuration of the two parameters is optional).

Therefore, the network device can configure multiple sets of L3 filter parameters, so that the terminal device can flexibly choose in the multiple sets of L3 filter parameters, thus keeping flexibility and improving performance.

In an implementation, the L3 filter parameter is only for the SRS-based RSRP measurement. That is, the L3 filtering is only performed on an SRS-based RSRP measurement quantity.

In an implementation, the L3 filter parameter is for the SRS-based RSRP measurement and the RSSI measurement. That is, the L3 filtering is performed on an SRS-based RSRP measurement quantity and an RSSI measurement quantity.

In an implementation, the L3 filter parameter is for the SRS-based RSRP measurement, and whether to filter an RSSI measurement quantity based on the L3 filter parameter is determined by the terminal device or according to a configuration of the network device.

In an implementation, if the L3 filter parameter is configured by the network device, and an IE for a filter parameter includes a filter configuration field for a synchronization signal block (Synchronization Signal Block, SSB) and/or a channel state information reference signal (Channel State Information Reference Signal, CSI-RS), the filter configuration field further includes configuration information for the L3 filter parameter.

That is, the L3 filter parameter can multiplex an existing IE for the filter parameter, only the filter configuration field for an SSB and/or a CSI-RS in the IE for the filter parameter needs to modify.

For example, an IE for the filter parameter is a quantity configuration (QuantityConfig) IE, the QuantityConfig IE includes a filter configuration field (FilterConfig) for an SSB and/or a CSI-RS, the FilterConfig may be:

```
FilterConfig ::= SEQUENCE {
filterCoefficientRSRP            FilterCoefficient
DEFAULT fc4,
filterCoefficientRSRQ            FilterCoefficient
DEFAULT fc4,
filterCoefficientRS-SINR         FilterCoefficient
DEFAULT fc4,
filterCoefficientRSRP2           FilterCoefficient
DEFAULT fc4, Description: corresponding to a filter parameter of an SRS-based RSRP measurement
filterCoefficientRSSI            FilterCoefficient
DEFAULT fc4 Description: corresponding to a filter parameter of an RSSI measurement }
```

In an implementation, if the L3 filter parameter is configured by the network device, and the IE for the filter parameter includes a first configuration field for an SSB and/or a CSI-RS, and the IE for the filter parameter further includes a second filter configuration field, the second filter configuration field includes the configuration information for the L3 filter parameter.

That is, the L3 filter parameter can multiplex an existing IE for the filter parameter. Only the configuration information field for the L3 filter parameter is added in the IE for the filter parameter.

For example, the IE for the filter parameter is a quantity configuration (QuantityConfig), the QuantityConfig IE includes a filter configuration field (FilterConfig) for an SSB and/or a CSI-RS, and a filter parameter (filterCoefficientRSRP2) is added in the QuantityConfig IE, where the filterCoefficientRSRP2 can only indicate a filter parameter of an SRS-based RSRP measurement quantity, or can indicate a filter parameter of an SRS-based RSRP measurement quantity and a filter parameter for an RSSI measurement quantity; the filter parameter of the SRS-based RSRP measurement quantity has a default value of fc4, and the filter parameter for the RSSI measurement quantity is optional configuration information, or, the filter parameter for the RSSI measurement quantity has a default value of fc4.

```
QuantityConfigNR::= SEQUENCE {
quantityConfigCell QuantityConfigRS,
quantityConfigRS-Index                              QuantityConfigRS
OPTIONAL -- Need M
FilterConfig ::= SEQUENCE {
filterCoefficientRSRP                               FilterCoefficient
DEFAULT fc4,
filterCoefficientRSRQ                               FilterCoefficient
DEFAULT fc4,
filterCoefficientRS-SINR                            FilterCoefficient
DEFAULT fc4
}
filterCoefficientRSRP2 SEQUENCE {
FilterCoefficient DEFAULT fc4, Description:
corresponding to a filter parameter of an SRS-based RSRP measurement quan-
tity
filterCoefficientRSSI                               FilterCoefficient
OPTIONAL, Description: corresponding to a filter parameter of an RSSI measurement quantity
}
```

In an implementation, one IE for a filter parameter includes configuration information for the L3 filter parameter, and does not include filter configuration information for an SSB and/or a CSI-RS.

For example, the following structure of FilterConfig2 (a newly defined IE for the filter parameter) includes the configuration information of an L3 filter parameter, and the filter parameter for the SRS-based RSRP measurement quantity is fc4 by default. Or the following structure of FilterConfig2 cannot include the filter parameter for the RSSI measurement quantity.

```
FilterConfig2 ::= SEQUENCE {
filterCoefficientRSRP2                    FilterCoefficient
DEFAULT fc4, Description: corresponding to a filter parameter of an SRS-based RSRP
measurement quantity
filterCoefficientRSSI                     FilterCoefficient
DEFAULT fc4 Description: corresponding to a filter parameter of an RSSI measurement quantity
}
```

For another example, the following structure of FilterConfig2 (a newly defined IE for filter parameter) includes the configuration information of an L3 filter parameter, and the filter parameter of the SRS-based RSRP measurement quantity is optional configuration information, and the filter parameter for the RSSI measurement quantity is optional configuration information. Or the following structure of FilterConfig2 cannot include the filter parameter for the RSSI measurement quantity.

```
FilterConfig2 ::= SEQUENCE {
filterCoefficientRSRP2                    FilterCoefficient
OPTIONAL, Description: corresponding to a filter parameter of an SRS-based RSRP measurement
quantity
filterCoefficientRSSI                     FilterCoefficient
OPTIONAL, Description: corresponding to a filter parameter of an RSSI measurement quantity
}
```

In an implementation, in the embodiment of the present application, the terminal device can report the measurement result based on the first configuration information to the network device.

Specifically, the network device can decide the uplink transmission and downlink transmission method according to the received report information, and perform corresponding transmission with the related terminal device. For example, if an RSRP value corresponding to one or some SRS resources reported by a current measuring terminal device is large, the network device should avoid, by scheduling or configuration, the interference caused by a corresponding measured terminal device (the interference source) to the current measuring terminal device;

if an RSRP value corresponding to one or some SRS resources reported by the current measuring terminal device is small, the network device can perform scheduling on a resource corresponding to the corresponding measured terminal device (the interference source) without affecting the performance of the current measuring terminal device.

And/or, if an RSSI value corresponding to one or some SRS resources reported by the current measuring terminal device is large, the network device should avoid, by scheduling or configuration, the interference caused by the corresponding measured terminal device (the interference source) to the current measuring terminal device; if an RSSI value corresponding to one or some SRS resources reported by the current measuring terminal device is small, the network device can perform scheduling on a resource corresponding to the corresponding measured terminal device (the interference source) without affecting the performance of the current measuring terminal device.

Therefore, in the embodiment of the present application, the network device can configure the SRS resource information and/or the time-frequency resource information, so that the SRS-based RSRP measurement is performed based on a resource indicated by the SRS resource information and the RSSI measurement is performed based on a resource indicated by the time-frequency resource information, and the network device also configures the cell indication information and/or the BWP indication information, so as to flexibly indicate that measurement is performed on a corresponding resource of which serving cell, or flexibly indicate that measurement is performed on which downlink BWP, so as to provide better flexibility for network cooperation.

Figure 10:
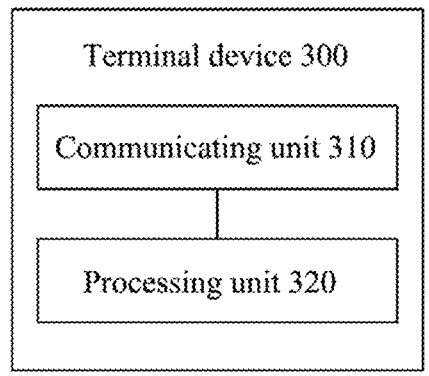
FIG. 10 is a schematic block diagram of a terminal device according to an embodiment of the present application.

FIG. 10 is a schematic block diagram of a terminal device 400 according to an embodiment of the present application. As show in FIG. 10, the terminal device 400 includes: a communicating unit 310, configured to receive first configuration information, the first configuration information including m pieces of resource indication information, where a resource indicated by the m pieces of resource indication information is used for performing SRS-based RSRP measurement and/or RSSI measurement, and m is a positive integer greater than or equal to 1; and a processing unit 320, configured to perform the SRS-based RSRP measurement and/or the RSSI measurement on the resource indicated by the m pieces of resource indication information.

In an implementation, each of the m pieces of resource indication information is used for indicating at least one or at least one set of SRS resource information and/or time-frequency resource information, and a resource indicated by the SRS resource information is used for performing the SRS-based RSRP measurement, a resource indicated by the time-frequency resource information is used for performing the RSSI measurement.

In an implementation, the SRS resource information and the time-frequency resource information can be configured in one measurement object information element IE.

In an implementation, the SRS resource information and the time-frequency resource information cannot be configured in one measurement object IE.

In an implementation, one measurement object IE includes a configuration field for mobility measurement configuration, and the configuration field further includes configuration information corresponding to the SRS resource information and/or the time-frequency resource information.

In an implementation, one measurement object IE includes a first configuration field for mobility measurement configuration, and the measurement object IE further includes a second configuration field, the second configuration field includes configuration information corresponding to the SRS resource information and/or the time-frequency resource information.

In an implementation, a sequence structure or a choice structure in the second configuration field carries the configuration information corresponding to the SRS resource information and/or the time-frequency resource information.

In an implementation, one measurement object IE only includes configuration information corresponding to the SRS resource information and/or the time-frequency resource information.

In an implementation, a sequence structure or a choice structure in the measurement object IE carries the configuration information corresponding to the SRS resource information and/or the time-frequency resource information.

In an implementation, the configuration information corresponding to the SRS resource information and/or the time-frequency resource information is optional configuration information.

In an implementation, the first configuration information further includes cell indication information, the cell indication information is used for indicating a cell corresponding to the resource indicated by the m pieces of resource indication information.

In an implementation, the first configuration information specifically only includes one piece of cell indication information, and a cell indicated by the one piece of cell indication information corresponds to the resource indicated by the m pieces of resource indication information.

In an implementation, the first configuration information specifically includes m pieces of cell indication information, and a cell indicated by i-th cell indication information corresponds to a resource indicated by i-th resource indication information, $0 < i \leq m$.

In an implementation, the m pieces of resource indication information and the m pieces of cell indication information correspond to a first IE, and a first field in the first IE includes the m pieces of cell indication information and the m pieces of cell indication information.

In an implementation, the m pieces of resource indication information and the m pieces of cell indication information correspond to a first IE, and a first field in the first IE includes a first sequence structure for the m pieces of resource indication information and a second sequence structure for the m pieces of cell indication information, where the first sequence structure includes m first elements, and an i-th first element corresponds to i-th resource indication information, the second sequence structure includes m second elements, and an i-th second element corresponds to i-th cell indication information.

In an implementation, the m pieces of resource indication information and the m pieces of cell indication information correspond to a first IE, and a first field in the first IE includes a first sequence structure for the m pieces of resource indication information, a second field in the first IE includes a second sequence structure for the m pieces of cell indication information, where the first sequence structure includes m first elements, and an i-th first element corresponds to i-th resource indication information, the second sequence structure includes m second elements, and an i-th second element corresponds to i-th cell indication information In an implementation, the m pieces of resource indication information and the m pieces of cell indication information correspond to a first IE, and a first field in the first IE includes a first sequence structure for the m pieces of resource indication information and the m pieces of cell indication information, where the first sequence structure includes m elements, and an i-th element corresponds to i-th resource indication information and i-th cell indication information.

In an implementation, if the first configuration information includes a field corresponding to cell indication information, and the cell indication information is not configured, a default cell corresponds to the resource indicated by the m pieces of resource indication information.

In an implementation, if the first configuration information does not include a field corresponding to cell indication information, a default cell corresponds to the resource indicated by the m pieces of resource indication information.

In an implementation, the default cell is at least one of:
a cell in all serving NR cells of the terminal device at present;
all cells in all serving NR cells of the terminal device at present;
a primary cell in a primary cell group accessed by the terminal device at present, and the primary cell is a NR cell;
a primary cell in a secondary cell group accessed by the terminal device at present, and the primary cell is a NR cell;
in a dual-connection scenario, a primary cell in a secondary cell group accessed by the terminal device at present, and the primary cell is a NR cell;
a cell of which identification is largest or smallest in all serving cells of the terminal device at present;
a cell of which identification is largest or smallest in all serving NR cells of the terminal device at present; or,
a default cell configured by a network device.

In an implementation, the m pieces of resource indication information correspond to a first IE, and a first field in the first IE includes a first sequence structure, where the first sequence structure includes m elements, and an i-th element corresponds to i-th resource indication information.

In an implementation, the m pieces of resource indication information correspond to a first IE, m fields in the first IE correspond to the m pieces of resource indication information, where an i-th field corresponds to i-th resource indication information.

In an implementation, one measurement object IE includes a configuration field for mobility measurement configuration, and the configuration field further includes configuration information corresponding to the cell indication information and/or the m pieces of resource indication information.

In an implementation, one measurement object IE includes a first configuration field for mobility measurement configuration, and the measurement object IE further includes a second configuration field, the second configuration field includes configuration information corresponding to the cell indication information and/or the m pieces of resource indication information.

In an implementation, a sequence structure or a choice structure in the second configuration field carries the configuration information corresponding to the cell indication information and/or the m pieces of resource indication information.

In an implementation, one measurement object IE comprises configuration information corresponding to the cell indication information and/or the m pieces of resource indication information, and does not comprises configuration information for mobility measurement.

In an implementation, a sequence structure or a choice structure in the second configuration field carries the configuration information corresponding to the cell indication information and/or the m pieces of resource indication information.

In an implementation, the configuration information corresponding to the cell indication information and/or the m pieces of resource indication information is optional configuration information.

In an implementation, the first configuration information further includes BWP indication information, the BWP indication information is used for indicating a BWP corresponding to the resource indicated by the m pieces of resource indication information.

In an implementation, the first configuration information specifically only includes one piece of BWP indication information, and a BWP indicated by the one piece of BWP indication information corresponds to the resource indicated by the m pieces of resource indication information.

In an implementation, the first configuration information specifically includes m pieces of BWP indication information, and a BWP indicated by i-th BWP indication information corresponds to a downlink BWP indicated by i-th resource indication information, $0 < i \leq m$.

In an implementation, the m pieces of resource indication information and the m pieces of BWP indication information correspond to a second IE, and a first field in the second IE includes the m pieces of resource indication information and the m pieces of BWP indication information.

In an implementation, the m pieces of resource indication information and the m pieces of BWP indication information correspond to a second IE, a first field in the second IE includes a first sequence structure for the m pieces of resource indication information and a second sequence structure for the m pieces of BWP indication information, where the first sequence structure includes m first elements, and an i-th first element corresponds to i-th resource indication information, the second sequence structure includes m second elements, and an i-th second element corresponds to i-th BWP indication information.

In an implementation, the m pieces of resource indication information and the m pieces of BWP indication information correspond to a second IE, a first field in the second IE includes a first sequence structure for the m pieces of resource indication information, a second field in the second IE includes a second sequence structure for the m pieces of BWP indication information, where the first sequence structure includes m first elements, and an i-th first element corresponds to i-th resource indication information, the second sequence structure includes m second elements, and an i-th second element corresponds to i-th BWP indication information.

In an implementation, the m pieces of resource indication information and the m pieces of BWP indication information correspond to a second IE, a first field in the second IE includes a first sequence structure for the m pieces of resource indication information and the m pieces of BWP indication information, where the first sequence structure includes m elements, and an i-th element corresponds to i-th resource indication information and i-th BWP indication information.

In an implementation, if the first configuration information includes a field corresponding to BWP indication information and the cell indication information is not configured, a default downlink BWP corresponds to the resource indicated by the m pieces of resource indication information.

In an implementation, if the first configuration information does not include a field corresponding to BWP indication information, a default downlink BWP corresponds to the resource indicated by the m pieces of resource indication information.

In an implementation, the default downlink BWP is at least one of:
an initial BWP in a cell corresponding to the m pieces of resource indication information;
an active BWP in a cell corresponding to the m pieces of resource indication information;
all BWPs in a cell corresponding to the m pieces of resource indication information;
one of all BWPs in a cell corresponding to the m pieces of resource indication information;

a BWP of which identification is largest or smallest in a cell corresponding to the m pieces of resource indication information; or,
a default downlink BWP configured by a network device.

In an implementation, the m pieces of resource indication information correspond to a second IE, and a first field in the second IE includes a first sequence structure, where the first sequence structure includes m elements, and an i-th element corresponds to i-th resource indication information.

In an implementation, the m pieces of resource indication information correspond to a second IE, m fields in the second IE correspond to the m pieces of resource indication information, where an i-th field is used for indicating i-th resource indication information.

In an implementation, one measurement object IE includes a configuration field for mobility measurement configuration, and the configuration field further includes configuration information corresponding to the BWP indication information and/or the m pieces of resource indication information.

In an implementation, one measurement object IE includes a first configuration field for mobility measurement configuration, and the measurement object IE further includes a third configuration field, the third configuration field includes configuration information corresponding to the BWP indication information and/or the m pieces of resource indication information.

In an implementation, a sequence structure or a choice structure in the third configuration field carries configuration information corresponding to the BWP indication information and/or the m pieces of resource indication information.

In an implementation, one measurement object IE includes configuration information corresponding to the BWP indication information and/or the m pieces of resource indication information, and does not includes configuration information for mobility measurement.

In an implementation, a sequence structure or a choice structure in the measurement object IE carries configuration information corresponding to the BWP indication information and/or the m pieces of resource indication information.

In an implementation, the configuration information corresponding to the BWP indication information and/or the m pieces of resource indication information is optional configuration information.

In an implementation, if each of the resource indication information in the m pieces of resource indication information is used for indicating at least one or a set of SRS resource information, the SRS resource information includes an SRS sequence identification.

In an implementation, if each of the resource indication information in the m pieces of resource indication information is used for indicating at least one or a set of SRS resource information, and the first configuration information includes a field corresponding to an SRS sequence identification, and the SRS sequence identification is not configured;
the communicating unit is further configured to receive second configuration information, the second configuration information being used for indicating a cell identification corresponding to an SRS generation sequence.

In an implementation, if each of the resource indication information in the m pieces of resource indication information is used for indicating at least one or a set of SRS resource information, and the first configuration information does not include a field corresponding to an SRS sequence identification;
the communicating unit 310 is further configured to receive second configuration information, the second configuration information being used for indicating a cell identification corresponding to an SRS generation sequence.

In an implementation, the communicating unit 310 is further configured to receive second configuration information, the second configuration information being used for indicating a cell identification corresponding to an SRS generation sequence, among them,
if the SRS resource information includes an SRS sequence identification, the SRS sequence identification corresponds to an initial parameter of an SRS generation sequence; or,
if the SRS resource information does not include an SRS sequence identification, the cell identification corresponds to an initial parameter of an SRS generation sequence.

In an implementation, the first configuration information and the second configuration information are carried in one RRC signaling.

In an implementation, the processing unit 320 is further configured to filter a measurement result according to an L3 filter parameter, where the L3 filter parameter is preconfigured or configured by a network device.

In an implementation, the L3 filter parameter is only for the SRS-based RSRP measurement.

In an implementation, the L3 filter parameter is for the SRS-based RSRP measurement and the RSSI measurement.

In an implementation, the L3 filter parameter is for SRS-based RSRP measurement, and whether to filter an RSSI measurement quantity based on the L3 filter parameter is determined by the terminal device or according to a configuration of a network device.

In an implementation, if the L3 filter parameter is configured by a network device, and an IE for a filter parameter includes a filter configuration field for a synchronization signal block SSB and/or a channel state information reference signal CSI-RS, the filter configuration field further includes configuration information for the L3 filter parameter.

In an implementation, if the L3 filter parameter is configured by a network device, and an IE for the filter parameter includes a first filter configuration field for an SSB and/or a CSI-RS, and the IE for a filter parameter further includes a second filter configuration field, the second filter configuration field includes configuration information for the L3 filter parameter.

In an implementation, one IE for a filter parameter includes configuration information for the L3 filter parameter, and does not include filter configuration information for an SSB and/or a CSI-RS.

In an implementation, the measurement includes CLI measurement.

It should be understand that, a terminal device 300 according to the embodiment of the present application can correspond to the terminal device in the method embodiment of the present application, and the above and other operations and/or functions of each unit in the terminal device 300 are respectively for implementing the corresponding flow of the terminal device in the method 200 shown in FIG. 3, details are not repeated herein for brevity.

Figure 11:
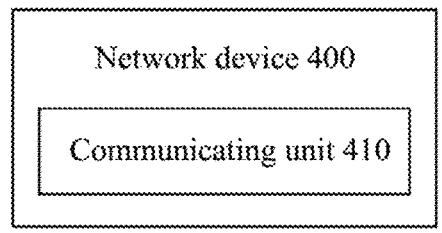
FIG. 11 is a schematic block diagram of a network device according to an embodiment of the present application.

FIG. 11 is a schematic block diagram of a network device 400 according to an embodiment of the present application. As shown in FIG. 11, the network device 400 includes:
a communicating unit 410, configured to send first configuration information, the first configuration information including m pieces of resource indication information, where a resource indicated by the m pieces of resource indication information is used for performing SRS-based RSRP measurement and/or RSSI measurement, and m is a positive integer greater than or equal to 1.

In an implementation, each of the m pieces of resource indication information is used for indicating at least one or at least one set of SRS resource information and/or time-frequency resource information, and a resource indicated by the SRS resource information is used for performing the SRS-based RSRP measurement, a resource indicated by the time-frequency resource information is used for performing the RSSI measurement.

In an implementation, the SRS resource information and the time-frequency resource information can be configured in one measurement object information element IE.

In an implementation, the SRS resource information and the time-frequency resource information cannot be configured in one measurement object IE.

In an implementation, one measurement object IE includes a configuration field for mobility measurement configuration, and the configuration field further includes configuration information corresponding to the SRS resource information and/or the time-frequency resource information.

In an implementation, one measurement object IE includes a first configuration field for mobility measurement configuration, and the measurement object IE further includes a second configuration field, the second configuration field includes configuration information corresponding to the SRS resource information and/or the time-frequency resource information.

In an implementation, a sequence structure or a choice structure in the second configuration field carries the configuration information corresponding to the SRS resource information and/or the time-frequency resource information.

In an implementation, one measurement object IE only includes configuration information corresponding to the SRS resource information and/or the time-frequency resource information.

In an implementation, a sequence structure or a choice structure in the measurement object IE carries the configuration information corresponding to the SRS resource information and/or the time-frequency resource information.

In an implementation, the configuration information corresponding to the SRS resource information and/or the time-frequency resource information is optional configuration information.

In an implementation, the first configuration information further includes cell indication information, the cell indication information is used for indicating a cell corresponding to the resource indicated by the m pieces of resource indication information.

In an implementation, the first configuration information specifically only includes one piece of cell indication information, and a cell indicated by the one piece of cell indication information corresponds to the resource indicated by the m pieces of resource indication information.

In an implementation, the first configuration information specifically includes m pieces of cell indication information, and a cell indicated by i-th cell indication information corresponds to a resource indicated by i-th resource indication information, $0 < i \leq m$.

In an implementation, the m pieces of resource indication information and the m pieces of cell indication information correspond to a first IE, and a first field in the first IE includes the m pieces of cell indication information and the m pieces of cell indication information.

In an implementation, the m pieces of resource indication information and the m pieces of cell indication information correspond to a first IE, and a first field in the first IE includes a first sequence structure for the m pieces of resource indication information and a second sequence structure for the m pieces of cell indication information, where the first sequence structure includes m first elements, and an i-th first element corresponds to i-th resource indication information, the second sequence structure includes m second elements, and an i-th second element corresponds to i-th cell indication information.

In an implementation, the m pieces of resource indication information and the m pieces of cell indication information correspond to a first IE, and a first field in the first IE includes a first sequence structure for the m pieces of resource indication information, a second field in the first IE includes a second sequence structure for the m pieces of cell indication information, where the first sequence structure includes m first elements, and an i-th first element corresponds to i-th resource indication information, the second sequence structure includes m second elements, and an i-th second element corresponds to i-th cell indication information.

In an implementation, the m pieces of resource indication information and the m pieces of cell indication information correspond to a first IE, and a first field in the first IE includes a first sequence structure for the m pieces of resource indication information and the m pieces of cell indication information, where the first sequence structure includes m elements, and an i-th element corresponds to i-th resource indication information and i-th cell indication information.

In an implementation, if the first configuration information includes a field corresponding to cell indication information, and the cell indication information is not configured, a default cell corresponds to the resource indicated by the m pieces of resource indication information.

In an implementation, if the first configuration information does not include a field corresponding to cell indication information, a default cell corresponds to the resource indicated by the m pieces of resource indication information.

In an implementation, the default cell is at least one of:
a cell in all serving new radio NR cells of a peer device at present;
all cells in all serving NR cells of a peer device at present;
a primary cell in a primary cell group accessed by a peer device at present, and the primary cell is a NR cell;
a primary cell in a secondary cell group accessed by a peer device at present, and the primary cell is a NR cell;
in a dual-connection scenario, a primary cell in a secondary cell group accessed by a peer device at present, and the primary cell is a NR cell;
a cell of which identification is largest or smallest in all serving cells of a peer device at present;
a cell of which identification is largest or smallest in all serving NR cells of a peer device at present; or,
a default cell configured by a network device.

In an implementation, the m pieces of resource indication information correspond to a first IE, and a first field in the first IE includes a first sequence structure, where the first sequence structure includes m elements, and an i-th element corresponds to i-th resource indication information.

In an implementation, the m pieces of resource indication information correspond to a first IE, m fields in the first IE correspond to the m pieces of resource indication information, where an i-th field corresponds to i-th resource indication information In an implementation, one measurement object IE includes a configuration field for mobility measurement configuration, and the configuration field further includes configuration information corresponding to the cell indication information and/or the m pieces of resource indication information.

In an implementation, one measurement object IE includes a first configuration field for mobility measurement configuration, and the measurement object IE further includes a second configuration field, the second configuration field includes configuration information corresponding to the cell indication information and/or the m pieces of resource indication information.

In an implementation, a sequence structure or a choice structure in the second configuration field carries the configuration information corresponding to the cell indication information and/or the m pieces of resource indication information.

In an implementation, one measurement object IE includes configuration information corresponding to the cell indication information and/or the m pieces of resource indication information, and does not includes configuration information for mobility measurement.

In an implementation, a sequence structure or a choice structure in the measurement object IE carries the configuration information corresponding to the cell indication information and/or the m pieces of resource indication information.

In an implementation, the configuration information corresponding to the cell indication information and/or the m pieces of resource indication information is optional configuration information.

In an implementation, the first configuration information further includes bandwidth part BWP indication information, the BWP indication information is used for indicating a BWP corresponding to the resource indicated by the m pieces of resource indication information.

In an implementation, the first configuration information, in particular, only includes one piece of BWP indication information, and a BWP indicated by the one piece of BWP indication information corresponds to the resource indicated by the m pieces of resource indication information.

In an implementation, the first configuration information specifically includes m pieces of BWP indication information, and a BWP indicated by i-th BWP indication information corresponds to a downlink BWP indicated by i-th resource indication information, $0 < i \leq m$.

In an implementation, the m pieces of resource indication information and the m pieces of BWP indication information correspond to a second IE, and a first field in the second IE includes the m pieces of resource indication information and the m pieces of BWP indication information.

In an implementation, the m pieces of resource indication information and the m pieces of BWP indication information correspond to a second IE, a first field in the second IE includes a first sequence structure for the m pieces of resource indication information and a second sequence structure for the m pieces of BWP indication information, where the first sequence structure includes m first elements, and an i-th first element corresponds to i-th resource indication information, the second sequence structure includes m second elements, and an i-th second element corresponds to i-th BWP indication information.

In an implementation, the m pieces of resource indication information and the m pieces of BWP indication information correspond to a second IE, a first field in the second IE includes a first sequence structure for the m pieces of resource indication information, a second field in the second IE includes a second sequence structure for the m pieces of BWP indication information, where the first sequence structure includes m first elements, and an i-th first element corresponds to i-th resource indication information, the second sequence structure includes m second elements, and an i-th second element corresponds to i-th BWP indication information.

In an implementation, the m pieces of resource indication information and the m pieces of BWP indication information correspond to a second IE, a first field in the second IE includes a first sequence structure for the m pieces of resource indication information and the m pieces of BWP indication information, where the first sequence structure includes m elements, and an i-th element corresponds to i-th resource indication information and i-th BWP indication information.

In an implementation, if the first configuration information includes a field corresponding to BWP indication information and the cell indication information is not configured, a default downlink BWP corresponds to the resource indicated by the m pieces of resource indication information.

In an implementation, if the first configuration information does not include a field corresponding to BWP indication information, a default downlink BWP corresponds to the resource indicated by the m pieces of resource indication information.

In an implementation, the default downlink BWP is at least one of:
  an initial BWP in a cell corresponding to the m pieces of resource indication information;
  an active BWP in a cell corresponding to the m pieces of resource indication information;
  all BWPs in a cell corresponding to the m pieces of resource indication information;
  one of all BWPs in a cell corresponding to the m pieces of resource indication information;
  a BWP of which identification is largest or smallest in a cell corresponding to the m pieces of resource indication information; or,
  a default downlink BWP configured by a network device.

In an implementation, the m pieces of resource indication information correspond to a second IE, and a first field in the second IE includes a first sequence structure, where the first sequence structure includes m elements, and an i-th element corresponds to i-th resource indication information.

In an implementation, the m pieces of resource indication information correspond to a second IE, m fields in the second IE correspond to the m pieces of resource indication information, where an i-th field is used for indicating i-th resource indication information.

In an implementation, one measurement object IE includes a configuration field for mobility measurement configuration, and the configuration field further includes configuration information corresponding to the BWP indication information and/or the m pieces of resource indication information.

In an implementation, one measurement object IE includes a first configuration field for mobility measurement configuration, and the measurement object IE further includes a third configuration field, the third configuration field includes configuration information corresponding to the BWP indication information and/or the m pieces of resource indication information.

In an implementation, a sequence structure or a choice structure in the third configuration field carries configuration information corresponding to the BWP indication information and/or the m pieces of resource indication information.

In an implementation, one measurement object IE includes configuration information corresponding to the BWP indication information and/or the m pieces of resource indication information, and does not includes configuration information for mobility measurement.

In an implementation, a sequence structure or a choice structure in the measurement object IE carries configuration information corresponding to the BWP indication information and/or the m pieces of resource indication information.

In an implementation, the configuration information corresponding to the BWP indication information and/or the m pieces of resource indication information is optional configuration information.

In an implementation, if each of the resource indication information in the m pieces of resource indication information is used for indicating at least one or a set of SRS resource information, the SRS resource information includes an SRS sequence identification.

In an implementation, if each of the resource indication information in the m pieces of resource indication information is used for indicating at least one or a set of SRS resource information, and the first configuration information includes a field corresponding to an SRS sequence identification, and the SRS sequence identification is not configured;

the communicating unit is further configured to send second configuration information, the second configuration information being used for indicating a cell identification corresponding to an SRS generation sequence.

In an implementation, if each of the resource indication information in the m pieces of resource indication information is used for indicating at least one or a set of SRS resource information, and the first configuration information does not include a field corresponding to an SRS sequence identification;

the communicating unit 410 is further configured to send second configuration information, the second configuration information being used for indicating a cell identification corresponding to an SRS generation sequence.

In an implementation, the communicating unit 410 is further configured to send second configuration information, the second configuration information is used for indicating a cell identification corresponding to an SRS generation sequence, where,
if the SRS resource information includes an SRS sequence identification, the SRS sequence identification corresponds to an initial parameter of an SRS generation sequence; or,
if the SRS resource information does not include an SRS sequence identification, the cell identification corresponds to an initial parameter of an SRS generation sequence.

In an implementation, the first configuration information and the second configuration information are carried in one RRC signaling.

In an implementation, the communicating unit 410 is further configured to send third configuration information, the third configuration information being used for configuring an L3 filter parameter, the L3 filter parameter being used for that peer device filters a measurement result for the first configuration information.

In an implementation, the L3 filter parameter is only for the SRS-based RSRP measurement.

In an implementation, the L3 filter parameter is for the SRS-based RSRP measurement and the RSSI measurement.

In an implementation, the L3 filter parameter is for the SRS-based RSRP measurement, and whether to filter an RSSI measurement quantity based on the L3 filter parameter is determined by the peer device or according to a configuration of a network device.

In an implementation, if an IE for a filter parameter includes a filter configuration field for a synchronization signal block SSB and/or a channel state information reference signal CSI-RS, the filter configuration field further includes configuration information for the L3 filter parameter.

In an implementation, if an IE for a filter parameter includes a first filter configuration field for an SSB and/or a CSI-RS, and the IE for a filter parameter further includes a second filter configuration field, the second filter configuration field includes configuration information for the L3 filter parameter.

In an implementation, one IE for a filter parameter includes configuration information for the L3 filter parameter, and does not include filter configuration information for an SSB and/or a CSI-RS.

In an implementation, the measurement includes CLI measurement.

It should be understand that, a network device 400 according to the embodiment of the present application can correspond to the network device in the method embodiment of the present application, and the above and other operations and/or functions of each unit in the network device 400 are respectively for implementing the corresponding flow of the terminal device in the method 200 shown in FIG. 3, details are not repeated herein for brevity.

Figure 12:
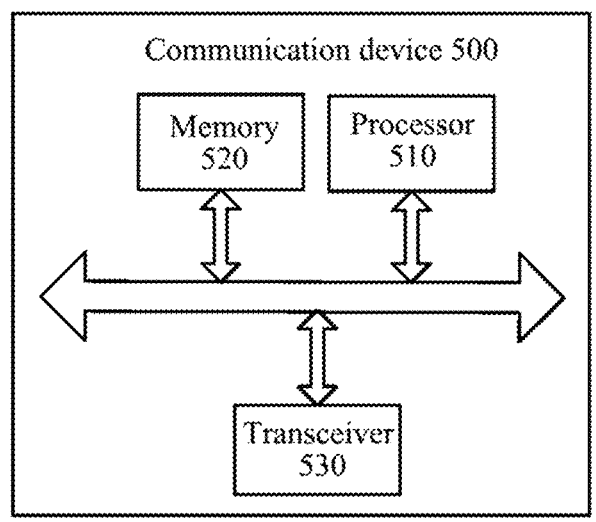
FIG. 12 is a schematic block diagram of a communication device according to an embodiment of the present application.

FIG. 12 is a schematic structural diagram of a communication device 500 provided by an embodiment of the present application. The communication device 500 shown in FIG. 12 includes a processor 510, and the processor 510 can call and run a computer program from a memory to implement the methods in the embodiments of the present application.

In an implementation, as shown in FIG. 12, the communication device 500 can further include a memory 520. The processor 510 can call and run a computer program from the memory 520 to implement the methods in the embodiments of the present application.

The memory 520 may be a separate device independent of the processor 510, or may be integrated into the processor 510.

In an implementation, as shown in FIG. 12, the communication device 500 can further include a transceiver 530, and the processor 510 can control the transceiver 530 to communicate with other devices. Specifically, the transceiver may send information or data to other devices, or receive information or data sent by other devices.

The transceiver 530 may include a transmitter and a receiver. The transceiver 530 may further include an antenna, and the number of the antennas may be one or more.

In an implementation, the communication device 500 may specifically be a network device of embodiments of the present application, and the communication device 500 may implement corresponding processes implemented by the network device in respective methods of the embodiments of the application. For brevity, details are not repeated here.

In an implementation, the communication device 500 may specifically be a mobile terminal/terminal device according to embodiments of the present application, and the communication device 500 may implement corresponding processes implemented by the mobile terminal/terminal device in respective methods of the embodiments of the present application. For brevity, details are not repeated here.

Figure 13:
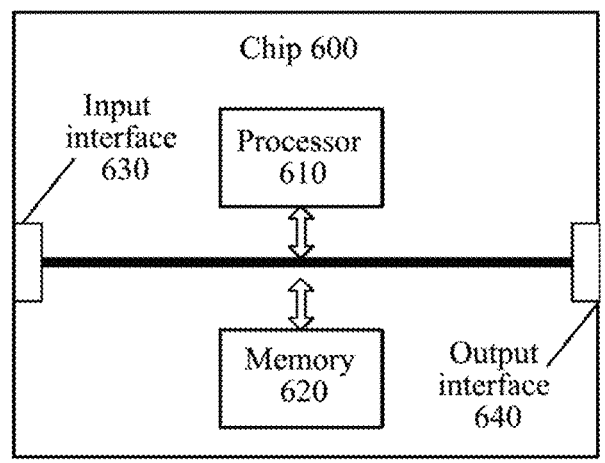
FIG. 13 is a schematic block diagram of a chip according to an embodiment of the present application.

FIG. 13 is a schematic structural diagram of a chip of an embodiment of the present application. The chip 600 shown in FIG. 13 includes a processor 610, and the processor 610 can call and run a computer program from a memory to implement the methods in the embodiments of the present application.

In an implementation, as shown in FIG. 13, the chip 600 can further include a memory 620. The processor 610 can call and run a computer program from the memory 620 to implement the methods in the embodiments of the present application.

The memory 620 may be a separate device independent of the processor 610, or may be integrated into the processor 610.

In an implementation, the chip 600 can further include an input interface 630. The processor 610 can control the input interface 630 to communicate with other devices or chips, and specifically to acquire information or data sent by other devices or chips.

In an implementation, the chip 600 can further include an output interface 640. The processor 610 can control the output interface 640 to communicate with other devices or chips, and specifically to output information or data to other devices or chips.

In an implementation, the chip can be applied to the network device in the embodiments of the present application, and the chip can implement corresponding processes implemented by the network device in respective methods of the embodiments of the present application. For brevity, details are not repeated here.

In an implementation, the chip can be applied to the mobile terminal/terminal device in the embodiments of the present application, and the chip can implement corresponding processes implemented by the mobile terminal/terminal device in respective methods of the embodiments of the present application. For brevity, details are not repeated here.

It should be understood that the chip mentioned in the embodiments of the present application may also be referred to as a system-level chip, a system chip, a chip system, a system-on-chip, or the like.

Figure 14:
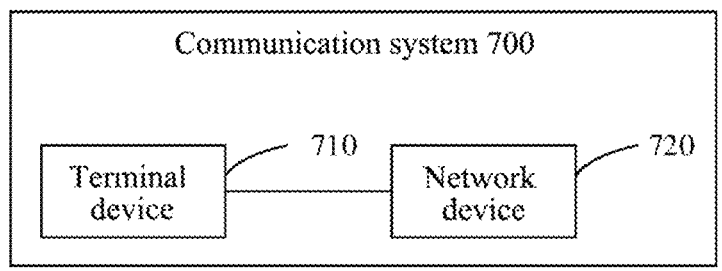
FIG. 14 is a schematic block diagram of a communication system according to an embodiment of the present application.

FIG. 14 is a schematic block diagram of a communication system 700 provided by an embodiment of the present application. As shown in FIG. 14, the communication system 700 includes a terminal device 710 and a network device 720.

The terminal device 710 can be configured to implement corresponding functions implemented by the terminal device in the foregoing methods, and the network device 720 can be configured to implement corresponding functions implemented by the network device in the foregoing methods. For brevity, details are not repeated here.

It should be understood that the processor of the embodiments of the present application may be an integrated circuit chip with signal processing capabilities. In the implementation process, the steps of the foregoing method embodiments can be completed by an integrated logic circuit in hardware of the processor or by instructions in the form of software. The above-mentioned processor may be a general-purpose processor, a digital signal processor (Digital Signal Processor, DSP), an application specific integrated circuit (Application Specific Integrated Circuit, ASIC), a field programmable gate array (Field Programmable Gate Array, FPGA) or other programming logic devices, discrete gates or transistor logic devices, discrete hardware components, which can implement or perform the methods, steps, and logical block diagrams disclosed in the embodiments of the present application. The general-purpose processor may be a microprocessor, or the processor may also be any conventional processor or the like. The steps of the methods disclosed in the embodiments of the present application can be directly embodied as being executed and completed by a hardware decoding processor, or being executed and completed by a combination of hardware and software modules in a decoding processor. The software modules can be located in a mature storage medium in the art such as a random access memory, a flash memory, a read-only memory, a programmable read-only memory, an electrically erasable programmable memory, a register, etc. The storage medium is located in a memory, and the processor reads information in the memory and completes the steps of the above methods in combination with hardware thereof.

It can be understood that the memory in the embodiments of the present application may be a volatile memory or a non-volatile memory, or may include both volatile and non-volatile memories. The non-volatile memory may be a read-only memory (Read-Only Memory, ROM), a programmable read-only memory (Programmable ROM, PROM), an erasable programmable read-only memory (Erasable PROM, EPROM), and an electrically erasable programmable read-only memory (Electrically EPROM, EEPROM) or a flash memory. The volatile memory may be a random access memory (Random Access Memory, RAM), which is used as an external cache. By way of exemplary but not restrictive description, many forms of RAMS are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM)) and a direct rambus random access memory (Direct Rambus RAM, DR RAM). It should be noted that the memories of the systems and methods described herein are intended to include, but are not limited to, these and any other suitable types of memories.

It should be understood that the foregoing memories are exemplary but not restrictive. For example, the memory in the embodiments of the present application may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch link dynamic random access memory (synch link DRAM, SLDRAM) and a direct memory bus random access memory (Direct Rambus RAM, DR RAM), etc. That is to say, the memories in the embodiments of the present application are intended to include, but not limited to, these and any other suitable types of memories.

An embodiment of the present application also provides a computer-readable storage medium for storing a computer program.

In an implementation, the computer-readable storage medium can be applied to the network device in the embodiments of the present application, and the computer program causes a computer to execute corresponding processes implemented by the network device in respective methods of the embodiments of the present application. For brevity, details are not repeated here.

In an implementation, the computer-readable storage medium can be applied to the mobile terminal/terminal device in the embodiments of the present application, and the computer program causes the computer to execute corresponding processes implemented by the mobile terminal/terminal in respective methods of the embodiments of the present application. For brevity, details are not repeated here.

An embodiment of the present application also provides a computer program product, including computer program instructions.

In an implementation, the computer program product can be applied to the network device in the embodiments of the present application, and the computer program instructions cause a computer to execute corresponding processes implemented by the network device in respective methods of the embodiments of the present application. For brevity, details are not repeated here.

In an implementation, the computer program product can be applied to the mobile terminal/terminal device in the embodiments of the present application, and the computer program instructions cause the computer to execute corresponding processes implemented by the mobile terminal/terminal device in respective methods of the embodiments of the present application. For brevity, details are not repeated here.

An embodiment of the present application also provides a computer program.

In an implementation, the computer program can be applied to the network device in the embodiments of the present application. When the computer program runs on a computer, the computer is caused to execute corresponding processes implemented by the network device in respective methods of the embodiments of the present application. For brevity, details are not repeated here.

In an implementation, the computer program can be applied to the mobile terminal/terminal in the embodiments of the present application. When the computer program runs on the computer, the computer is caused to execute corresponding processes implemented by the mobile terminal/terminal in respective methods of the embodiments of the present application. For brevity, details are not repeated here.

A person of ordinary skill in the art may realize that the units and algorithm steps of the examples described in combination with the embodiments disclosed herein can be implemented by electronic hardware, or a combination of computer software and electronic hardware. Whether these functions are executed by hardware or software depends on specific applications and design constraints for the technical solution. Those skilled persons can use different methods to implement the described functions for each specific application, but such implementations should not be considered to be beyond the scope of the present application.

Those skilled in the art can clearly understand that, for convenience and concise description, the corresponding processes in the foregoing method embodiments may be referred to for the specific working processes of the above-described system, apparatus, and unit, and details are not repeated here.

It should be understood that the system, apparatus, and method disclosed in the several embodiments provided in the present application may be implemented in other ways. For example, the apparatus embodiments described above are merely illustrative. For example, the division of the units is only a logical function division, and there may be other divisions in actual implementation. For example, multiple units or components may be combined or may be integrated into another system, or some features can be ignored or not implemented. In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present application may be integrated into one processing unit, or each unit may exist alone physically, or two or more units may be integrated into one unit.

If the functions are implemented in the form of software functional units and sold or used as an independent product, they can be stored in a computer readable storage medium. Based on such understanding, the essence, or the part that contributes to the prior art, or part of the technical solutions of the present application can be embodied in the form of a software product. The computer software product is stored in a storage medium, including several instructions used to cause a computer device (which may be a personal computer, a server, or a network device, etc.) to execute all or part of the steps of the methods described in the various embodiments of the present application. The aforementioned storage medium includes: a U disk, a mobile hard disk, a read-only memory (Read-Only Memory, ROM), a random access memory (Random Access Memory, RAM), a magnetic disk, an optical disk, or other media that can store program codes.

The above description is only specific implementations of the present application, but the protection scope of the present application is not limited thereto. Any person skilled in the art can easily think of changes or substitutions within the technical scope disclosed in the present application, which should be covered within the protection scope of the present application. Therefore, the protection scope of the present application shall be subject to the protection scope of the claims.

What is claimed is:

1. A wireless communication method, comprising:
receiving, by a terminal device, first configuration information, the first configuration information comprising m pieces of resource indication information, wherein a resource indicated by the m pieces of resource indication information is used for performing at least one of sounding reference signal (SRS)-based reference signal receiving power (RSRP) measurement and received signal strength indication (RSSI) measurement, and m is a positive integer greater than or equal to 1, wherein the SRS-based RSRP measurement and the RSSI measurement both comprise cross-link interference (CLI) measurement; and performing, by the terminal device, at least one of the SRS-based RSRP measurement and the RSSI measurement on the resource indicated by the m pieces of resource indication information;

wherein if the first configuration information comprises a field corresponding to cell indication information, and the field corresponding to the cell indication information is not configured, a default cell corresponds to the resource indicated by the m pieces of resource indication information.

2. The method according to claim 1, wherein each of the m pieces of resource indication information is used for indicating at least one or at least one set of SRS resource information and time-frequency resource information, and a resource indicated by the SRS resource information is used for performing the SRS-based RSRP measurement, a resource indicated by the time-frequency resource information is used for performing the RSSI measurement.

3. The method according to claim 2, wherein configuration information corresponding to the SRS resource information and configuration information corresponding to the time-frequency resource information is configured in one measurement object information element (IE); or configuration information corresponding to the SRS resource information or configuration information corresponding to the time-frequency resource information is configured in one measurement object information element (IE).

4. The method according to claim 3, wherein a sequence structure or a choice structure in the measurement object IE carries at least one of the configuration information corresponding to the SRS resource information and the configuration information corresponding to the time-frequency resource information.

5. The method according to claim 4, wherein at least one of the configuration information corresponding to the SRS resource information and the configuration information corresponding to the time-frequency resource information is optional configuration information.

6. The method according to claim 1, wherein the first configuration information further comprises the cell indication information, the cell indication information is used for indicating a cell corresponding to the resource indicated by the m pieces of resource indication information.

7. The method according to claim 6, wherein the first configuration information specifically comprises m pieces of cell indication information, and a cell indicated by i-th cell indication information corresponds to a resource indicated by i-th resource indication information, $0<i\leq m$.

8. The method according to claim 6, wherein one measurement object IE comprises at least one of configuration information corresponding to the cell indication information and the m pieces of resource indication information, and does not comprises configuration information for mobility measurement.

9. The method according to claim 1, wherein the default cell is at least one of:
a cell in all serving new radio (NR) cells of the terminal device at present;
all cells in all serving NR cells of the terminal device at present;
a primary cell in a primary cell group accessed by the terminal device at present, and the primary cell is a NR cell;
a primary cell in a secondary cell group accessed by the terminal device at present, and the primary cell is a NR cell;
in a dual-connection scenario, a primary cell in a secondary cell group accessed by the terminal device at present, and the primary cell is a NR cell;
a cell of which identification is largest or smallest in all serving cells of the terminal device at present;
a cell of which identification is largest or smallest in all serving NR cells of the terminal device at present; or,
a default cell configured by a network device.

10. The method according to claim 1, wherein the m pieces of resource indication information correspond to a first IE, and a first field in the first IE comprises a first sequence structure, wherein the first sequence structure comprises m elements, and an i-th element corresponds to i-th resource indication information.

11. The method according to claim 1, wherein the first configuration information further comprises bandwidth part (BWP) indication information, the BWP indication information is used for indicating a BWP corresponding to the resource indicated by the m pieces of resource indication information.

12. The method according to claim 11, wherein one measurement object IE comprises at least one of configuration information corresponding to the BWP indication information and the m pieces of resource indication information, and does not comprises configuration information for mobility measurement.

13. The method according to claim 1, wherein if the first configuration information does not comprise a field corresponding to BWP indication information, a default downlink BWP corresponds to the resource indicated by the m pieces of resource indication information.

14. The method according to claim 13, wherein the default downlink BWP is at least one of:
an initial BWP in a cell corresponding to the m pieces of resource indication information;
an active BWP in a cell corresponding to the m pieces of resource indication information;
all BWPs in a cell corresponding to the m pieces of resource indication information;
one of all BWPs in a cell corresponding to the m pieces of resource indication information;
a BWP of which identification is largest or smallest in a cell corresponding to the m pieces of resource indication information; or,
a default downlink BWP configured by a network device.

15. The method according to claim 13, wherein the m pieces of resource indication information correspond to a second IE, and a first field in the second IE comprise a first sequence structure, wherein the first sequence structure comprises m elements, and an i-th element corresponds to i-th resource indication information.

16. The method according to claim 1, wherein if each of the resource indication information in the m pieces of resource indication information is used for indicating at least one or a set of SRS resource information, the SRS resource information comprises an SRS sequence identification.

17. The method according to claim 1, wherein the method further comprises:
filtering, by the terminal device, a measurement result according to an L3 filter parameter, wherein the L3 filter parameter is preconfigured or configured by a network device.

18. The method according to claim 17, wherein the L3 filter parameter is for the SRS-based RSRP measurement and the RSSI measurement.

19. A terminal device, comprising:
a processor and a memory, wherein the memory is configured to store a computer program, and the processor is configured to call and run the computer program stored in the memory to:
control an input interface to receive first configuration information, wherein the first configuration information comprises m pieces of resource indication information, wherein a resource indicated by the m pieces of resource indication information is used for performing at least one of sounding reference signal (SRS)-based reference signal receiving power (RSRP) measurement and received signal strength indication (RSSI) measurement, and m is a positive integer greater than or equal to 1, wherein the SRS-based RSRP measurement and the RSSI measurement both comprise cross-link interference (CLI) measurement; and
perform at least one of the SRS-based RSRP measurement and the RSSI measurement on the resource indicated by the m pieces of resource indication information;
wherein if the first configuration information comprises a field corresponding to cell indication information, and the field corresponding to the cell indication information is not configured, a default cell corresponds to the resource indicated by the m pieces of resource indication information.

* * * * *